(12) United States Patent
Shinoda

(10) Patent No.: US 7,142,365 B2
(45) Date of Patent: *Nov. 28, 2006

(54) OPTICAL LENS, CONDENSER LENS, OPTICAL PICKUP, AND OPTICAL RECORDING/REPRODUCING APPARATUS

(75) Inventor: Masataka Shinoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/119,095

(22) Filed: Apr. 29, 2005

(65) Prior Publication Data
US 2005/0190454 A1  Sep. 1, 2005

Related U.S. Application Data

(63) Continuation of application No. 10/433,795, filed as application No. PCT/JP02/10559 on Oct. 10, 2002, now Pat. No. 6,989,930.

(30) Foreign Application Priority Data

| Oct. 10, 2001 | (JP) | ............................ 2001-312853 |
| Oct. 31, 2001 | (JP) | ............................ 2001-334948 |
| Nov. 28, 2001 | (JP) | ............................ 2001-362967 |

(51) Int. Cl.
G02B 27/02 (2006.01)
G11B 7/12 (2006.01)

(52) U.S. Cl. .................. 359/618; 359/719; 369/112.23

(58) Field of Classification Search ................ 359/719, 359/618; 369/47.1, 112.01, 112.23
See application file for complete search history.

(56) References Cited

U.S. PATENT DOCUMENTS

| 5,729,323 A | 3/1998 | Arden et al. |
| 5,838,489 A | 11/1998 | Erdmann |
| 5,946,282 A | 8/1999 | Hirono et al. |
| 6,061,174 A | 5/2000 | Shiozawa et al. |
| 6,115,179 A | 9/2000 | Chu et al. |
| 6,208,459 B1 | 3/2001 | Coon et al. |
| 6,407,389 B1 | 6/2002 | Nishii et al. |
| 6,558,316 B1 | 5/2003 | Kikuchi et al. |
| 6,989,930 B1* | 1/2006 | Shinoda ...................... 359/618 |
| 2001/0003724 A1 | 6/2001 | Yamaguchi et al. |
| 2002/0039341 A1* | 4/2002 | Kikuchi et al. ........ 369/112.23 |
| 2002/0065186 A1 | 5/2002 | Yoshii et al. |
| 2003/0100433 A1 | 5/2003 | Hayashi et al. |
| 2004/0022162 A1 | 2/2004 | Endoh et al. |

FOREIGN PATENT DOCUMENTS

| EP | 0875778 | 11/1998 |
| JP | 10-260349 | 9/1998 |
| JP | 11-273126 | 10/1999 |
| JP | 2002-055201 | 2/2002 |

* cited by examiner

Primary Examiner—Scott J. Sugarman
Assistant Examiner—Darryl J. Collins
(74) Attorney, Agent, or Firm—Robert J. Depke; Rockey, Depke, Lyons & Kitzinger LLC

(57) ABSTRACT

The present invention provides an optical lens having a high refractive index and a low light absorption characteristic in an ultraviolet-wavelength region; a condenser lens composed of the optical lens, fit for the near-field optical recording/reproducing system; an optical pickup that includes the condenser lens and can reduce the condensed light spot irradiating a recording medium and also manage to make the recording medium higher in recording density and greater in capacity; and an optical recording/reproducing apparatus comprising the optical pickup to enable optical recording and reproduction in high recording density to be performed.

3 Claims, 13 Drawing Sheets

Practice Example 4 WO₃

Comparison Example 3 SiO₂

OPTICAL LENS, CONDENSER LENS, OPTICAL PICKUP, AND OPTICAL RECORDING/REPRODUCING APPARATUS

The subject matter of application Ser. No. 10/433,795 is incorporated herein by reference. The present application is a continuation of U.S. application Ser. No. 10/433,795, filed Jun. 5, 2003 now U.S. Pat. No. 6,989,930, which claims priority to WIPO Patent Application No. PCT/JP02/10559, filed Oct. 10, 2002, Japanese Patent Application No. JP2001-312853, filed Oct. 10, 2001, Japanese Patent Application No. JP2001-334948, filed Oct. 31, 2001, and Japanese Patent Application No.JP2001-362967, filed Nov. 28, 2001. The present application claims priority to these previously filed applications.

TECHNICAL FIELD

The present invention relates to an optical lens, a condenser lens composed of a plurality of optical lenses, an optical pickup having at least a light source and a condenser lens composed of a plurality of optical lenses, and an optical recording/reproducing apparatus (including a magneto-optical recording/reproducing apparatus). More particularly, it relates to an optical lens, a condenser lens, an optical pickup, and an optical recording/reproducing apparatus (including a magneto-optical recording/reproducing apparatus) fit for a so-called near-field optical recording/reproducing system which records on and reproduces from an optical recording medium (including a magneto-optical recording medium) by increasing a numerical aperture of an optical lens using a high-refractive-index optical lens material, or using an optical lens material of cubic crystal, having a small light absorption in a ultraviolet-wavelength region of 420 nm or less.

BACKGROUND ART

The optical recording medium (including a magneto-optical recording medium) represented by a compact disc (CD), a minidisc (MD), and a digital video disc (DVD) is widely utilized as a storage medium of music information, video information, data, programs and so on.

However, by demands for a higher sound quality, a higher picture quality, a longer operable time and a greater capacity in music information, video information, data, programs and the like, an optical recording medium (including a magneto-optical recording medium) having a still greater capacity as well as an optical recording/reproducing apparatus (including a magneto-optical recording/reproducing apparatus) for recording on and reproducing from such optical recording medium are desired.

Thus, to cope with the above-described demands, in the optical recording/reproducing apparatus (including a magneto-optical recording/reproducing apparatus), it has been attempted to reduce wavelengths of a light source, e.g. a semiconductor laser or increase a numerical aperture of a condenser lens for reducing a diameter of a light spot converged through the condenser lens.

For example, as to the semiconductor laser, a GaN semiconductor laser having oscillation wavelengths reduced from 635 nm of the conventional red color laser to 400 nm region is being put into practice, whereby the diameter of light spot is being reduced.

Moreover, as to making the wavelengths still shorter than that, for example, a far-ultraviolet solid laser UW-1010 made by Sony corporation, which continuously emits light of a single wavelength of 266 nm is sold. The diameter of light spot is thus being aimed to make still smaller. In addition thereto, the research and development of a double-wave laser of Nd:YAG laser (266 nm region), a diamond laser (235 nm region), a double-wave laser of GaN laser (202 nm region) and the like are being proceeded.

Furthermore, a near-field optical recording/reproducing system is examined, in which a condenser lens having a numerical aperture of, e.g. 1 or more is materialized by using, e.g. an optical lens with a large numerical aperture, represented by a solid immersion lens (SIL), and also an objective surface of the condenser lens is made to approach the recording medium so that a distance between them may be about a wavelength of light from a light source, for recording and reproduction.

In this near-field optical recording/reproducing system, it is important how to keep the distance between the recording medium and condenser lens in an optical contact condition.

Moreover, as a diameter of luminous flux which is emitted from a light source and incident on a condenser lens becomes small, the distance between the recording medium and condenser lens becomes extremely small, so that the shape of a condenser lens will greatly be restricted.

In this connection, a schematic structure diagram of a main part of an optical pickup having the above-described condenser lens is shown in FIG. 12.

As shown in FIG. 12, this optical pickup is provided with a condenser lens 53 composed of a first optical lens 51 in a super-hemisphere shape (a shape having an addition to a hemisphere) and a second optical lens 52 which are arranged successively from an objective side where a recording medium (an optical recording medium or a magneto-optical recording medium) 50 exists.

Both of the first optical lens 51 and the second optical lens 52 are made of glass (that of a refractive index n=2.0, or $SiO_2$ glass of a refractive index n=1.5).

This condenser lens 53 can converge luminous flux L to irradiate the recording medium 50.

Moreover, an objective surface of the condenser lens 53, i.e. the surface of the first optical lens 51 facing the recording medium 50 is made to approach the recording medium 50, and the condenser lens 53 forms that of the above-described near-field optical recording/reproducing system.

The first optical lens 51 in the shape of a super-hemisphere has a relation $t=r(1+1/n)$, where r is a curvature radius of the optical lens, n being a refractive index n of the optical lens, and t being a thickness of the optical lens. In this case, if the refractive index n=2.0, then t=1.5r. If the refractive index n=1.5, then t=1.667r.

Furthermore, where WD is a distance between the second optical lens 52 and the recording medium 50, which depends on a numerical aperture of the second optical lens 52, a condition t<WD must be satisfied. In other words, when the refractive index n=2.0, a condition $t=r(1+1/n)=1.5r<WD$ must be satisfied. When the refractive index n=1.5, a condition $t=r(1+1/n)=1.667r<WD$ must be satisfied.

Therefore, to secure a distance D between the first optical lens 51 and the second optical lens 52 appropriately and easily, it is necessary to form the curvature radius r of the first optical lens 51 as small as possible, or select its material so as to make its refractive index n as large as possible.

However, the curvature radius r of the first optical lens 51 cannot be reduced to about 1 mm or less due to a restriction on the accuracy in assembling an optical pickup.

In the near-field optical recording/reproducing system, the condenser lens 53 having a numerical aperture of 1 or more is materialized by combining two optical lenses of the first and second optical lenses 51, 52 generally arranged in turn from the objective side. However, the larger a numerical aperture becomes, the higher precision is required in assembling these first and second optical lenses 51, 52 and also it is required to keep this high precision against a change of surroundings.

Moreover, if a curvature radius of the optical lens is too small, it becomes impossible to heighten the precision in assembling the condenser lens 53 composed of the two optical lenses 51, 52. Accordingly, it is impossible to make the curvature radius r of the first optical lens 51 smaller than about 1 mm.

Furthermore, because glass has been used as material of the optical lens in the past, the refractive index n of optical lens could not exceed about the aforesaid 2.0.

Therefore, the lower limit of thickness t of the first optical lens 51 was about 1.5 mm and making it smaller than that was impossible.

When $SiO_2$ glass is used, the limit of refractive index n of optical lens is the aforesaid 1.5 or so, the limit of thickness t of the first optical lens 51 being 1.667 mm or so, and making it smaller than that being impossible.

On the other hand, to realize a high-density recording in the near-field optical recording/reproducing system, the same as the conventional optical recording/reproducing system, it is necessary to reduce a size and area of a condensed light spot irradiating a recording medium by shortening a wavelengths of light emitted from a light source and increasing a numerical aperture of a condenser lens. In this connection, because an area of the condensed light spot is inversely proportional to the square of a numerical aperture of condenser lens, to realize a high-density recording in the near-field recording/reproducing system, it is effective to increase the numerical aperture of condenser lens.

In the structure where the first optical lens 51 is a super-hemispherical optical lens shown in FIG. 12, a numerical aperture NA of the near-field condenser lens 53 can be expressed by NA=(a numerical aperture of the second optical lens 52)×(a refractive index n of the first optical lens 51)×(a refractive index n of the first optical lens 51).

As described above, because glass has been used as materials of the first and second optical lenses 51, 52 until now, a refractive index n of the first optical lens 51 could not exceed about 2.0. Thus, where a numerical aperture of the second optical lens 52 is,. e.g. 0.45, the numerical aperture NA of near-field system condenser lens 53 becomes NA=0.45×2.0×2.0=1.8 and it was impossible to increase the numerical aperture NA more than that value.

Also, when $SiO_2$ glass is used as materials of the first and second optical lenses 51, 52 because the limits of refractive index n of the first optical lens 51 is about 1.5, where a numerical aperture of the second optical lens is, e.g. 0.45 as well, the numerical aperture NA of near-field condenser lens 53 becomes NA=0.45×1.5×1.5=1.0 and it will be impossible to increase the numerical aperture NA over that value.

Accordingly, with the conventional near-field condenser lens 53 made of glass materials, there is the limits to realize a high-density recording.

Furthermore, up to now, optical lens materials for 420 nm wavelengths or less, having a low light absorption as well as a cubic crystal characteristic fit for the aforesaid solid immersion lens (SIL) has been unclear.

In order to solve the above-described problems, the present invention provides: an optical lens having a high refractive index and low light absorption characteristic in a ultraviolet-wavelengths region; a condenser lens composed of the optical lens, fit for the near-field optical recording/ reproducing system; an optical pickup that includes the condenser lens and can reduce the condensed light spot irradiating a recording medium and also manage to make the recording medium higher in recording density and greater in capacity; and an optical recording/reproducing apparatus that comprises such optical pickup and can perform a high-density optical recording and reproduction.

DISCLOSURE OF THE INVENTION

The present invention provides an optical pickup having at least a light source and a condenser lens that converges light emitted from the light source to form a light spot, in which the light source emits light of wavelengths in the range of 390~450 nm, and the condenser lens is composed of one or more optical lenses including an optical lens which is made of strontium titanate or mainly made of strontium titanate and has an absorption coefficient of $2.0 \text{ cm}^{-31}$ or less to the light emitted from the light source.

In the optical pickup according to the present invention, the light source is formed of a GaN semiconductor laser.

Further, in the optical pickup according to the invention, the condenser lens is composed of the optical lens made of strontium titanate or mainly made of strontium titanate and another optical lens which are arranged successively from the objective side so that their optical axes may be aligned with each other.

According to the above-described structure of optical pickup of the present invention, because the optical lens is made of strontium titanate or mainly made of strontium titanate, the optical pickup can have a high refractive index (about 2.6 or over) and a high permeability to the light of wavelengths in the range of 390~450 nm emitted from the light source. This makes it possible to shorten the wavelengths of light emitted from light source to the range of 390~450 nm, namely, to make the wavelengths shorter than that of light from the conventional light source in a visible light region for reducing the condensed light spot, and also to make the numerical aperture of condenser lens larger by virtue of the high refractive index of optical lens for further reducing the condensed light spot.

Moreover, because an absorption coefficient to the light emitted from the light source of optical lens (wavelengths in the range of 390~450 nm) is $2.0 \text{ cm}^{-1}$ or less, a light loss becomes smaller and the efficiency of optical recording and reproduction can be improved.

The present invention provides an optical recording/ reproducing apparatus for recording on and reproducing from a recording medium, which comprises an optical pickup having at least a light source and a condenser lens for converging light emitted from the light source to form a light spot, wherein light of wavelengths in the range of 390~450 nm is emitted from the light source, and the condenser lens is composed of one or more optical lenses including an optical lens made of strontium titanate or mainly made of strontium titanate, which has an absorption coefficient of $2.0 \text{ cm}^{-1}$ or less to the light emitted from light source.

In the above-described optical recording/reproducing apparatus according to the present invention, the light source is formed of a GaN semiconductor laser.

Further, in the optical recording/reproducing apparatus according to the present invention, the condenser lens is composed of an optical lens made of strontium titanate or mainly made of strontium titanate and another optical lens, which are arranged successively from the objective side so as to keep their optical axes aligned with each other.

According to the above-described structure of optical recording/reproducing apparatus of the present invention, by comprising the above-described optical pickup to record on and reproduce from a recording medium, it is possible to efficiently perform the optical recording on the recording medium and the reproduction from that in high recording density.

The present invention provides an optical lens which is made of any optical material selected among $HfO_2$, $HfO_2$—$Y_2O_3$, $HfO_2$—$TiO_2$, $HfO_2$—$Sc_2O_3$, $HfO_2$—$Nd_2O_3$, $HfO_2$-$Ln_2O_3$, $Sc_2O_3$, $MgO$, $Y_2O_3$, $WO_3$, $Gd_2O_3$, $Eu_2O_3$, $Dy_2O_3$ or mainly made of the selected optical material forming the major component.

According to the above-described structure of optical lens of the present invention, because it is made of any optical material selected among $HfO_2$, $HfO_2$—$Y_2O_3$, $HfO_2$—$TiO_2$, $HfO_2$—$Sc_2O_3$, $HfO_2$—$Nd_2O_3$, $HfO_2$-$Ln_2O_3$, $Sc_2O_3$, $MgO$, $Y_2O_3$, $WO_3$, $Gd_2O_3$, $Eu_2O_3$, $Dy_2O_3$ or mainly made of the selected optical material as the major component, and further these optical materials have a high refractive index and a high transmissivity in an ultraviolet-wavelength region, it is possible to form an optical lens having a high refractive index and a low absorption characteristic in the ultraviolet-wavelengths region.

The present invention provides a condenser lens composed of one or more optical lenses including an optical lens made of any optical material selected among $HfO_2$, $HfO_2$—$Y_2O_3$, $HfO_2$—$TiO_2$, $HfO_2$—$Sc_2O_3$, $HfO_2$—$Nd_2O_3$, $HfO_2$-$Ln_2O_3$, $Sc_2O_3$, $MgO$, $Y_2O_3$, $WO_3$, $Gd_2O_3$, $Eu_2O_3$, $Dy_2O_3$ or mainly made of the selected optical material as the major component.

The above-described condenser lens according to the present invention is composed of an optical lens made of the optical material or mainly made of the optical material and other optical lens(es), which are arranged with their optical axes aligned.

According to the above-described structure of condenser lens of the present invention, because it is composed of one or more optical lenses including the above-described optical lens of the present invention, it is possible to form a condenser lens having a high refractive index and a low absorption characteristic in an ultraviolet-wavelength region. At the same time, because the optical lens has a high refractive index, it is possible to increase a numerical aperture of the condenser lens and reduce a light spot formed by condensing the incident light by the condenser lens.

The present invention provides an optical pickup having at least a light source and a condenser lens for converging light emitted from the light source to form a light spot, in which the light source emits light of wavelengths in the range of 190~450 nm, and the condenser lens is composed of one or more optical lenses including an optical lens made of any optical material selected among $HfO_2$, $HfO_2$—$Y_2O_3$, $HfO_2$—$TiO_2$, $HfO_2$—$Sc_2O_3$, $HfO_2$—$Nd_2O_3$, $HfO_2$-$Ln_2O_3$, $Sc_2O_3$, $MgO$, $Y_2O_3$, $WO_3$, $Gd_2O_3$, $Eu_2O_3$, $Dy_2O_3$ or mainly made of the selected optical material as the major component.

In the above-described optical pickup according to the present invention, the optical lens made of the optical material or mainly made of the optical material has an absorption coefficient of 2.0 $cm^{-1}$ or less to the light emitted from light source.

Further, in the above optical pickup according to the present invention, the light source is formed of a GaN semiconductor laser.

Also, in the above optical pickup according to the present invention, the light source is formed of any one of a double-wave laser of Nd:YAG laser, a double-wave laser of GaN laser, an Ar gas laser and a diamond laser.

Also, in the above optical pickup according to the present invention, the condenser lens is composed of the optical lens made of the optical material or mainly made of the optical material and other optical lens(es), which are arranged successively from an objective side with their optical axes aligned.

According to the above-described structure of optical pickup of the present invention, because the condenser lens is composed of one or more optical lenses including the above-described optical lens of the present invention, the optical pickup has a high refractive index and a high transmissivity to the light of wavelengths in the range of 190~450 nm emitted from light source. This makes it possible to make the light emitted from light source into light of wavelengths in the range of 190~450 nm, namely, light in a ultraviolet-wavelength region where wavelengths are shorter than those, of light in a visible-light region from the conventional light source for reducing the condensed light spot. At the same time, because the optical lens has a high refractive index, a numerical aperture of the condenser lens can be enlarged for making the condensed light spot still smaller.

The present invention provides an optical recording/reproducing apparatus for recording on and reproducing from a recording medium, which comprises an optical pickup having at least a light source and a condenser lens for converging light emitted from the light source, wherein the light source emits light of wavelengths in the range of 190~450 nm and the condenser lens is composed of one or more optical lenses including an optical lens made of any optical material selected among $HfO_2$, $HfO_2$—$Y_2O_3$, $HfO_2$—$TiO_2$, $HfO_2$—$Sc_2O_3$, $HfO_2$—$Nd_2O_3$, $HfO_2$-$Ln_2O_3$, $Sc_2O_3$, $MgO$, $Y_2O_3$, $WO_3$, $Gd_2O_3$, $Eu_2O_3$, $Dy_2O_3$ or mainly made of the selected optical material.

In the above optical recording/reproducing apparatus according to the present invention, the optical lens made of the optical material or mainly made of the optical material has an absorption coefficient of 2.0 $cm^{-1}$ or less to the light emitted from light source.

Also, in the optical recording/reproducing apparatus according to the present invention, the light source is formed of a GaN semiconductor laser.

Also, in the optical recording/reproducing apparatus according to the present invention, the light source is formed of any one of a double-wave laser of Nd:YAG laser, a double-wave laser of GaN laser, an Ar gas laser, and a diamond laser.

Further, in the optical recording/reproducing apparatus according to the present invention, the condenser lens is composed of an optical lens made of the optical material or mainly made of the optical material and other optical lens(es), which are arranged successively from an objective side with their optical axes aligned.

According to the above optical recording/reproducing apparatus of the present invention, because it comprises the above-described optical pickup of the present invention for recording on and reproducing from a recording medium, it is possible to efficiently perform the optical recording on a recording medium and optical reproduction from that in high density.

The present invention provides an optical lens made of any optical material selected among $BaF_2$, $CaF_2$, $LiF$, $NaF$ or mainly made of the selected optical material.

According to the above-described structure of optical lens of the present invention, because it is made of the optical material selected among $BaF_2$, $CaF_2$, LiF, NaF or mainly made of the selected optical material, each of which has a high transmissivity in an ultraviolet-wavelengths region, it is possible to form an optical lens having a low absorption characteristic in the ultraviolet-wavelengths region. Moreover, because these optical materials belong to a cubic crystal system and so can be worked easily without caring the direction of crystal axis, it is possible to manufacture the optical lens at a low working cost.

The present invention provides a condenser lens composed of one or more optical lenses including an optical lens made of any optical material selected among $BaF_2$, $CaF_2$, LiF, NaF or mainly made of the selected optical material.

The above condenser lens according to the present invention is composed of the optical lens made of the optical material or mainly made of the optical material and other optical lens(es), which are arranged with their optical axes aligned.

According to the above-described structure of condenser lens of the present invention, because it is composed of one or more optical lenses including the above-described optical lens of the present invention, it is possible to form a condenser lens having a low absorption characteristic in the ultraviolet-wavelength region and also manufacture the condenser lens at a low cost because of the low working cost of optical lens.

The present invention provides an optical pickup having at least a light source and a condenser lens for converging light emitted from the light source, in which the light source emits light of wavelengths in the range of 100~420 nm and the condenser lens is composed of one or more optical lenses including an optical lens made of any optical material selected among $BaF_2$, $CaF_2$, LiF, NaF or mainly made of the selected optical material.

In the above-described optical pickup according to the present invention, the light source is formed of a GaN semiconductor laser.

In the above optical pickup according to the present invention, the light source is formed of any one of a double-wave laser of Nd:YAG laser, a double-wave laser of GaN laser, an Ar gas laser, and a diamond laser.

Also, in the above optical pickup according to the present invention, the condenser lens is composed of the optical lens made of the optical material or mainly made of the optical material and other optical lens(es), which are arranged successively from an objective side with their optical axes aligned.

According to the above-described structure of optical pickup of the present invention, because the condenser lens is composed of one or more optical lenses including the above-described optical lens of the present invention, the optical pickup has a high transmissivity to the light of wavelengths in the range of 100~420 nm, emitted from light source. This enables that the light emitted from light source is made into the light of wavelengths in the range of 100~420 nm, namely, that of wavelengths in an ultraviolet region which is shorter than those of the conventional visible light from light source, for reducing the condensed light spot.

The present invention provides an optical recording/reproducing apparatus for recording on and reproducing from a recording medium, which comprises an optical pickup having at least a light source and a condenser lens for converging light emitted from the light source, wherein the light source emits light of wavelengths in the range of 100~420 nm and the condenser lens is composed of one or more optical lenses including an optical lens made of optical material selected among $BaF_2$, $CaF_2$, LiF, NaF or mainly made of the selected optical material.

In the above optical recording/reproducing apparatus according to the present invention, the light source is formed of a GaN semiconductor laser.

Also, in the above optical recording/reproducing apparatus according to the present invention, the light source is formed of any one of a double-wave laser of Nd:YAG laser, a double-wave laser of GaN laser, an Ar gas laser, and a diamond laser.

Also, in the above optical recording/reproducing apparatus according to the present invention, the condenser lens is composed of the optical lens made of the optical material or mainly made of the optical material and other optical lens(es), which are arranged successively from an objective side with their optical axes aligned.

According to the above-described structure of optical recording/reproducing apparatus of the present invention, because it comprises the above-described optical pickup of the present invention for recording on and reproducing from a recording medium, it is possible to optically record on and reproduce from a recording medium with efficiency and in a high recording density.

BEST MODE FOR CARRYING OUT THE INVENTION

Figure 1:
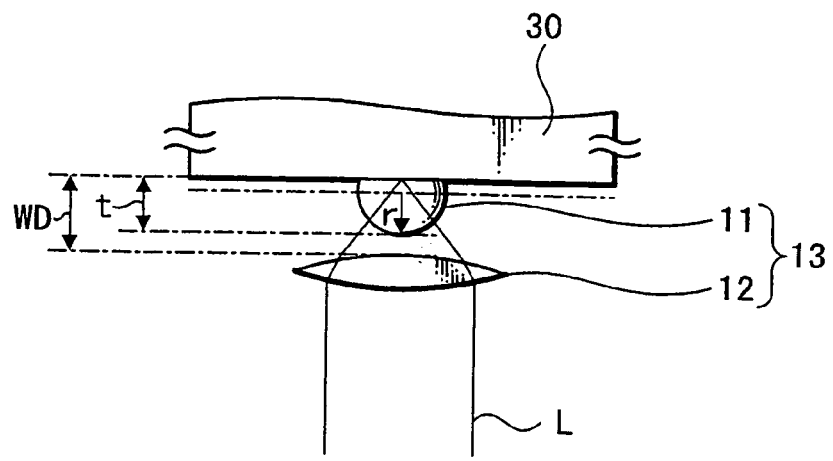
FIG. 1 is a schematic constitutional diagram showing a main part of an optical pickup according to an embodiment of the present invention.

To begin with, a scheme of the present invention will be described before describing specific embodiments of the present invention.

The present invention employs, as a first structure, an optical lens made of strontium titanate or mainly made of strontium titanate. This means that the optical lens may contain any component other than strontium titanate. The optical lens made of strontium titanate or mainly made of strontium titanate is hereinafter referred to as optical lens made of strontium titanate.

A general chemical formula of strontium titanate is $SrTiO_3$. In the present invention, strontium titanate includes not only those in which a mole ratio (composition ratio) of Sr:Ti:O is 1:1:3 but also what has the other composition.

Preferably, the optical lens made of strontium titanate is formed of a single crystal of strontium titanate. This eliminates grain boundaries as in polycrystal materials and striae as in glass materials, so that scattering and absorption of incident light are advantageously avoided.

In order to increase a refractive index or a transmissivity, other components such as Ta, Ca, Zr, K, Ba are added to the main component of strontium titanate. Those to which these components are added can also be formed as a single crystal, so that they are fit for optical materials.

Moreover, strontium titanate ($SrTiO_3$) has a cubic crystal structure, so that it has an optical isotropy in which a refractive index is fixed in all directions independently on the crystal axis.

Thus, when manufacturing the optical lenses made of strontium titanate, it is possible to cut, work and grind them without caring the direction of crystal axis.

Therefore, they are workable at about the same cost as in glass materials.

A single crystal forming the optical lens made of strontium titanate can be produced by the Bernoulli method and the like. The Bernoulli method is a crystal-growing method applicable for mass production, which can grow a comparatively large single crystal in a short time for an industrial use.

In the present invention, the condenser lens is composed of one or more optical lenses including the above-described optical lens, i.e. the optical lens made of strontium titanate.

Specifically, the condenser lens is formed in any one of the following structures A to C.

A. condenser lens composed of one optical lens made of strontium titanate.

B. condenser lens composed by combining a plurality of optical lenses made of strontium titanate.

C. condenser lens composed by combining an optical lens made of strontium titanate with other optical lens(es) made of other optical materials.

Additionally, in the structure C, the optical lens made of strontium titanate of the plurality of optical lenses is disposed in a position nearest to an object, i.e. a recording medium.

Further, a light source which emits light of wavelengths in the range of 390~450 nm is employed. In other words, instead of the conventional light source which emits light of wavelengths in the visible-light region (e.g. 635 nm), a light source which emits light of shorter wavelengths is employed. An example of such a light source is a GaN semiconductor laser.

The optical pickup having at least such a light source and the above-described condenser lens is thus formed.

This enables the light emitted from light source to be that of shorter wavelengths to reduce a light spot condensed by the condenser lens.

Moreover, because strontium titanate has a high refractive index of about 2.6 to the light of wavelengths in the range of 390~450 nm, it is possible to make a numerical aperture of the condenser lens larger. By making larger of the numerical aperture of condenser lens, the condensed light spot can also be reduced. Therefore, it is possible to deal with a high-density recording in combination with the light source of shorter wavelengths.

Furthermore, the optical lens made of strontium titanate has an excellent light permeability (light transmissivity) to the above-described light of wavelengths in the range of 390~450 nm.

In the present invention, an absorption coefficient of the optical lens made of strontium titanate to the light emitted from light source (light of wavelengths in the range of 390~450 nm) is made to be 2.0 $cm^{-1}$ or less.

This makes it possible to reduce a light loss due to the optical lens made of strontium titanate and thus improve the efficiency of optical recording and reproduction.

The absorption coefficient should preferably be small and is desired to be 0.1 $cm^{-1}$ or less so that there may be almost no loss due to the optical lens. If the absorption coefficient is made to be 0.1 $cm^{-1}$, then an internal transmissivity of optical lens of 5 mm in thickness can be increased to 95% or over.

Incidentally, a refractive index of a single crystal of strontium titanate to the light of wavelengths in the range of 390~450 nm is approximately equal, whereas its absorption coefficient to the light of wavelengths in the range of 390~450 nm differs depending on its crystal state.

Accordingly, it is necessary to control the composition, manufacturing conditions, etc. of the optical lens made of strontium titanate so that the absorption coefficient may be 2.0 $cm^{-1}$ or less.

For example, by controlling an oxygen deficit concentration or a composition ratio of strontium titanate Sr/Ti to be the optimum, the absorption coefficient can be made as small as 2.0 $cm^{-1}$ or less.

The oxygen deficit concentration can be adjusted by changing a time period of heat treatment in an oxygen atmosphere after growing the single crystal.

By making the composition ratio of Sr/Ti, e.g. smaller than 1 (Ti-rich composition), the absorption coefficient can be controlled to be small.

The absorption coefficient can also be controlled by adding an additive such as Ta, Ca, Zr, K, Ba to strontium titanate.

Because strontium titanate has a high refractive index, a numerical aperture of the condenser lens can be enlarged (e.g. 2.0 or more) as described above, thereby allowing the condenser lens to be smaller in size and thickness.

This enables such condenser lens to be installed in the optical pickup device, the optical recording/reproducing apparatus or the like at a comparatively low cost.

Moreover, when the condenser lens is composed of an optical lens made of strontium titanate and other optical lens (optical lens made of strontium titanate or optical lens made of other material), which are arranged sequentially from an objective side with their optical axes aligned, namely, when the condenser lens is composed of a plurality of optical lenses including an optical lens made of strontium titanate, which corresponds to the above-described structure B or C, it is possible to reduce a diameter of luminous flux incident on the condenser lens.

The reason is that, because the optical lens made of strontium titanate arranged on the objective side has a high refractive index, a necessary numerical aperture of the other optical lens for obtaining the same numerical aperture (e.g. 2.0) of condenser lens can be made to be small, so that a curvature radius of the other optical lens can be made to be small. When the curvature radius is small, even if the diameter of incident luminous flux is made to be small, a sufficient distance from the other optical lens to a recording medium can be secured to attain a high precision in assembling the condenser lens composed of a plurality of optical lenses.

Because the diameter of luminous flux incident on condenser lens can thus be made to be small, it is possible to make the condenser lens small in size and light in weight, which is controlled to be driven in a focusing direction or in a tracking direction on an optical recording medium, and also to improve servo characteristics such as a focusing servo, a tracking servo, and a seek time.

Therefore, the present invention can provide an optical pickup and an optical recording/reproducing apparatus which are capable of making wavelengths of a light source shorter and making the density of recording medium higher and the capacity thereof greater.

The present invention employs, as a second structure, an optical lens made of optical material selected among $HfO_2$, $HfO_2$—$Y_2O_3$, $HfO_2$—$TiO_2$, $HfO_2$—$Sc_2O_3$, $HfO_2$—$Nd_2O_3$, $HfO_2$-$Ln_2O_3$, $Sc_2O_3$, MgO, $Y_2O_3$, $WO_3$, $Gd_2O_3$, $Eu_2O_3$, $Dy_2O_3$ or mainly made of the selected optical material. This means that the optical lens can contain any other component than the selected optical material. The optical lens made of the selected material or mainly made of the selected material is hereinafter referred to as optical lens made of the high-refractive-index optical material. Of those optical materials, each of $HfO_2$—$Y_2O_3$, $HfO_2$—$TiO_2$, $HfO_2$—$Sc_2O_3$, $HfO_2$—$Nd_2O_3$, $HfO_2$-$Ln_2O_3$ is what each of $Y_2O_3$, $TiO_2$, $Sc_2O_3$, $Nd_2O_3$, $Ln_2O_3$ (lanthanoid oxide) is added to $HfO_2$ for increasing the refractive index or transmissivity.

In addition, each of the above-described optical materials includes not only those having stoichiometric composition expressed in a general chemical formula but also those having the other composition. It also includes what contains a small amount of impurities.

Preferably, the optical lens made of the high-refractive-index optical material is formed of a single crystal of the optical material. This eliminates grain boundaries as in polycrystal materials and striae as in glass materials, so that scattering and absorption of incident light are advantageously avoided.

Moreover, $HfO_2$ whose crystal structure is cubic has an optical isotropy in which the refractive index is fixed in all directions independently on the crystal axis. Similarly, each of the optical materials $Sc_2O_3$, MgO, $Y_2O_3$, $WO_3$, $Gd_2O_3$, $Eu_2O_3$, $Dy_2O_3$ whose crystal structure is cubic or quasi-cubic (in case of $WO_3$) has also an optical isotropy in which the refractive index is fixed in all directions independently on the crystal axis.

Thus, when manufacturing the optical lenses made of the high-refractive-index optical material, it is possible to cut, work and grind them without caring the direction of crystal axis.

Therefore, they are workable at about the same cost as in glass materials.

Optical materials forming the optical lens made of the high-refractive-index optical material can be produced by vacuum evaporation, sputtering, electron vacuum evaporation, vertical-lift method (CZ process), Bernoulli method, floating zone method (FZ method), Bridgman technique, flux method, top seed method (TSSG method), travelling solvent floating zone method (TSFZ method), laser annealing method, thermo-crystallization (solid phase crystal growth) method, gas phase crystal growth (chemical vapor deposition: CVD) method, plasma CVD method, and so on.

In the present invention, the condenser lens is composed of one or more optical lenses including the above-described optical lens made of the high-refractive index optical material.

Specifically, the condenser lens is formed in any one of the following structures A to C.

A. a condenser lens composed of one optical lens made of the high-refractive-index optical material.
B. a condenser lens composed by combining a plurality of optical lenses made of the high-refractive-index optical material.
C. a condenser lens composed by combining an optical lens made of the high-refractive-index optical material with other optical lens made of the other optical material.

Additionally, in the structure C, the optical lens made of the high-refractive-index optical material among the plurality of optical lenses is disposed in a position nearest to an object, i.e. a recording medium.

Further, in the present invention, a light source which emits light of wavelengths in the range of 190~450 nm is employed. In other words, instead of the conventional light source which emits light of wavelengths in the visible-light region (e.g. 635 nm), a light source which emits light of shorter wavelengths is employed. Examples of such light source are, in addition to a GaN semiconductor laser, a double-wave laser of Nd:YAG laser, a double-wave laser of GaN laser, an Ar gas laser, a diamond laser, and so forth.

The optical pickup including at least such light source and the above-described condenser lens is thus formed.

In this way, light emitted from the light source can be made into that of shorter wavelengths to reduce a spot light condensed by condenser lens.

Moreover, because the above selected high-refractive-index optical material has a higher refractive index than that of conventional glass or fluoride, to the light of wavelengths in the range of 190~450 nm, it is possible to make the numerical aperture of condenser lens larger. By making the numerical aperture of condenser lens larger, the condensed light spot can also be reduced. Therefore, it is possible to deal with a high-density recording in combination with the light source of shorter wavelengths.

When $HfO_2$ is employed for the above selected high-refractive-index optical material, the refractive index of optical lens can be increased to 2.0 or higher and an excellent light permeability (light transmissivity) to light of wavelengths longer than 190 nm can be obtained.

Similarly, when $HfO_2$—$Y_2O_3$ is employed, the refractive index of optical lens becomes 1.8 or higher and an excellent light transmissivity to light of wavelengths longer than 250 nm can be obtained.

When $HfO_2$—$TiO_2$ is employed, the refractive index of optical lens becomes 2.15 or higher and an excellent light permeability (light transmissivity) to light of wavelengths longer than 350 nm can be obtained.

When $HfO_2$—$Sc_2O_3$ is employed, the refractive index of optical lens becomes 1.75 or higher and the excellent light permeability (light transmissivity) to light of wavelengths longer than 300 nm can be obtained.

When $HfO_2$—$Nd_2O_3$ is employed, the refractive index of optical lens becomes 1.80 or higher and an excellent light permeability (light transmissivity) to light of wavelengths longer than 350 nm can be obtained.

When $HfO_2$-$Ln_2O_3$ is employed, the refractive index of optical lens becomes 1.90 or higher and an excellent light permeability (light transmissivity) to light of wavelengths longer than 250 nm can be obtained.

When $Sc_2$—$O_3$ is employed, the refractive index of optical lens becomes 1.85 or higher and an excellent light permeability (light transmissivity) to light of wavelengths longer than 250 nm can be obtained.

When MgO is employed, the refractive index of optical lens becomes 1.71 or higher and an excellent light permeability (light transmissivity) to light of wavelengths longer than 190 nm.

When $Y_2O_3$ is employed, the refractive index of optical lens becomes 1.75 or higher and an excellent light permeability (light transmissivity) to light of wavelengths longer than 300 nm can be obtained.

When $WO_3$ is employed., the refractive index of optical lens becomes 2.0 or higher and an excellent light permeability (light transmissivity) to light of wavelengths longer than 280 nm can be obtained.

When $Gd_2O_3$ is employed, the refractive index of optical lens becomes 1.88 or higher and an excellent light permeability (light transmissivity) to light of wavelengths longer than 350 nm can be obtained.

When $Eu_2O_3$ is employed, the refractive index of optical lens becomes 1.9 or higher and an excellent light permeability (light transmissivity) to light of wavelengths longer than 350 nm can be obtained.

When $Dy_2O_3$ is employed, the refractive index of optical lens becomes 1.86 or higher and an excellent light permeability (light transmissivity) to light of wavelengths longer than 300 nm can be obtained.

The optical lens made of the above selected high-refractive-index optical material has an excellent light permeability (light transmissivity) to the above-described light of wavelengths in the range of 190~450 nm.

Further, in the present invention, an absorption coefficient of the optical lens made of high-refractive-index optical material to light emitted from light source (light of wavelengths in the range of 190~450 nm) is made to be 2.0 $cm^{-1}$ or less.

This makes it possible to reduce a light loss due to the optical lens made of high-refractive-index optical material and improve the efficiency of optical recording and reproduction.

It is preferable that the absorption coefficient is small. The absorption coefficient is desired to be 0.1 $cm^1$ or less so that the optical lens may make almost no light loss. If the absorption coefficient is 0.1 $cm^{-1}$, then a transmissivity of optical lens of 5 mm in thickness can be 95% or more.

Incidentally, a refractive index of each of the optical materials to the light of wavelengths in the range of 190~450 nm is approximately definite regardless of its crystal state, whereas the absorption coefficient to the light of wavelengths in the range of 190~450 nm may differ depending on its crystal state.

Accordingly, it is desirable to control the composition, manufacturing conditions, etc. of the optical lens made of high-refractive-index optical material so that the absorption coefficient may become 2.0 $cm^{-1}$ or less.

For example, by controlling the oxygen deficit concentration or the composition ratio to be the optimum, the absorption coefficient can be made as small as 2.0 $cm^{-1}$ or less.

The oxygen deficit concentration can be adjusted by changing a time period of heat treatment in an oxygen atmosphere after growing the single crystal.

In addition, because each of the above-described optical materials has a high refractive index, the numerical aperture of condenser lens can be made to be large (e.g. 1.5 or more) as described above, thereby allowing the condenser lens to be smaller in size and thickness.

This enables such condenser lens to be installed in an optical pickup device, an optical recording/reproducing apparatus and the like at a comparatively low cost.

Moreover, when the condenser lens is composed of an optical lens made of the high-refractive-index optical material and other optical lens (optical lens made of the high-refractive-index optical material or other material) which are arranged sequentially from an objective side with their optical axes aligned, namely, when the condenser lens is composed of a plurality of optical lenses including an optical lens made of the high-refractive-index optical material, which corresponds to the above-described structure B or C, it is possible to reduce a diameter of luminous flux incident on the condenser lens.

The reason is that, because an optical lens made of the high-refractive-index optical material arranged on the objective side has a high refractive index, a numerical aperture of the other optical lens required for realizing the same numerical aperture (e.g. 2.0) of condenser lens can be made to be small, so that a curvature radius of the other optical lens can be made to be small. When the curvature radius is small, even if the diameter of incident luminous flux is made to be small, a sufficient distance from the other optical lens to a recording medium can be secured to realize a high precision in assembling the condenser lens composed of a plurality of optical lenses.

Because the diameter of luminous flux incident on condenser lens can thus be made to be small, it is possible to make the condenser lens small in size and light in weight, which is controlled to be driven in a focusing direction or in a tracking direction on an optical recording medium, and also to improve servo characteristics such as a focusing servo, a tracking servo, and a seek time.

Therefore, the present invention can provide an optical pickup and optical recording/reproducing apparatus which are capable of making the wavelengths of light source shorter (e.g. wavelengths 190~450 nm) and making the density of recording medium higher and the capacity thereof greater.

The present invention employs, as a third structure, an optical lens made of optical material selected among $BaF_2$, $CaF_2$, LiF, and NaF or mainly made of the selected optical material. This means that the optical lens may contain any components other than the selected optical material. An optical lens made of the selected optical material or mainly made of such optical material is hereinafter referred to as an optical lens made of fluoride optical material.

In addition, each of the above-described optical materials includes not only those having stoichiometric composition expressed in a general chemical formula but also those having the other composition. It also includes what contains a small amount of impurities.

Preferably, the optical lens made of fluoride optical material is formed of a single crystal of the optical material. This eliminates grain boundaries as in polycrystal materials and striae as in glass materials, so that scattering and absorption of incident light are advantageously avoided.

Moreover, $BaF_2$ whose crystal structure is cubic has an optical isotropy in which the refractive index is fixed in all directions independently on the crystal axis. Similarly, each of optical materials $CaF_2$, LiF, NaF whose crystal structure is also cubic has an optical isotropy in which the refractive index is fixed in all directions independently on the crystal axis.

Thus, when manufacturing the optical lens made of fluoride material, it is possible to cut, work and grind it without caring the direction of its crystal axis.

Accordingly, it is workable at about the same low cost as in glass materials.

Therefore, when the optical pickup and optical recording/reproducing apparatus are composed of the condenser lens using the optical lens made of fluoride optical material and the light source using, e.g. a GaN semiconductor laser, it can be attained very effectively to make short of wavelengths of light source and work the condenser lens at a low cost, thereby allowing an optical recording medium of higher density and greater capacity to be realized.

Further, the optical materials forming the optical lens made of fluoride optical material can be produced by the Bridgman-Stockbarger technique and the like, and a single crystal of high quality and large diameter can be produced with comparative ease.

In the present invention, the condenser lens is composed of one or more optical lenses including the above-described optical lens made of fluoride optical material.

Specifically, the condenser lens is formed in any one of the following structures A to C.

A. a condenser lens composed of one optical lens made of the fluoride optical material.
B. a condenser lens composed by combining a plurality of optical lenses made of the fluoride optical material.
C. a condenser lens composed by combining an optical lens made of the fluoride optical material with other optical lens(es) made of other optical material.

Additionally, in the structure C, the optical lens made of fluoride optical material among the plurality of optical lenses is disposed in a position nearest to an object, i.e. a recording medium.

Further, in the present invention, a light source which emits light of wavelengths in the range of 100~420 nm is employed. In other words, instead of the conventional light source which emits light of wavelengths in the visible-light region (e.g. 635 nm), a light source which emits light of shorter wavelengths is employed. Examples of such light source are, in addition to a GaN semiconductor laser, a double-wave laser of Nd:YAG laser, a double-wave laser of GaN laser, an Ar gas laser, a diamond laser, and so forth.

In this way, the optical pickup including at least the light source and the aforesaid condenser lens is composed.

According to this construction, it is possible to make shorter of wavelengths of light emitted from light source and make smaller of a light spot condensed by the condenser lens.

Further, the above selected fluoride optical material has a small light absorption to light of wavelengths in the range of 100~420 nm, a particularly smaller light absorption than the conventional glass or oxide materials, thus having light transmissivity of 95% or more to, e.g. light of wavelengths in the range of 390~420 nm which is oscillation wavelengths of GaN semiconductor laser.

When $BaF_2$ material is employed as one of the above selected fluoride optical materials to form the optical lens, it is possible to make a light absorbing characteristic extremely small in an ultraviolet-wavelengths region of 420 nm or less. The 420 nm has been the limit in optical lenses made of conventional glass or oxide materials. Besides, the optical lens using $BaF_2$ material has an excellent light permeability (light transmissivity) to light of wavelengths longer than 150 nm, so that, in the optical pickup and optical recording/reproducing apparatus formed using the optical lens made of $BaF_2$ material, a light efficiency of recording and reproduction to the light source can be heightened.

Moreover, when $BaF_2$ material is employed for forming an optical lens, its crystal system can be made to be a cubic one. Thus, when manufacturing hemispherical or superhemispherical optical lenses, it is possible to work, grind and cut them without caring the direction of their crystal axes, so that the optical lenses can be manufactured at about the same low work cost as in conventional glass materials.

Similarly, an optical lens formed using $CaF_2$ material has an excellent light permeability (light transmissivity) to light of wavelengths longer than 130 nm and its crystal system can be made to be a cubic one.

Likewise, an optical lens formed using LiF material has an excellent light permeability (light transmissivity) to light of wavelengths longer than 110 nm and its crystal system can be made to be a cubic one.

Similarly, an optical lens formed using NaF material has an excellent light permeability (light transmissivity) to light of wavelengths longer than 140 nm and its crystal system can be made to be a cubic one.

Therefore, the present invention can provide an optical pickup and optical recording/reproducing apparatus capable of making shorter of wavelengths of a light source (e.g. 100~420 nm) and realizing a recording medium of higher density and greater capacity.

Additionally, the optical pickup according to the present invention includes one for reproduction only, one for recording only, and one for both recording and reproduction.

The optical pickup according to the present invention includes one for performing a magneto-optical recording and reproduction with respect to a magneto-optical recording medium, and also includes such optical pickup that a magneto-optical recording system is combined with the near-field optical reproduction system, e.g. that a magnetic coil, etc. is incorporated in part of the optical pickup.

Again, the optical recording/reproducing apparatus according to the present invention includes one for reproduction only, one for recording only, and one for both recording and reproduction.

Figure 12:
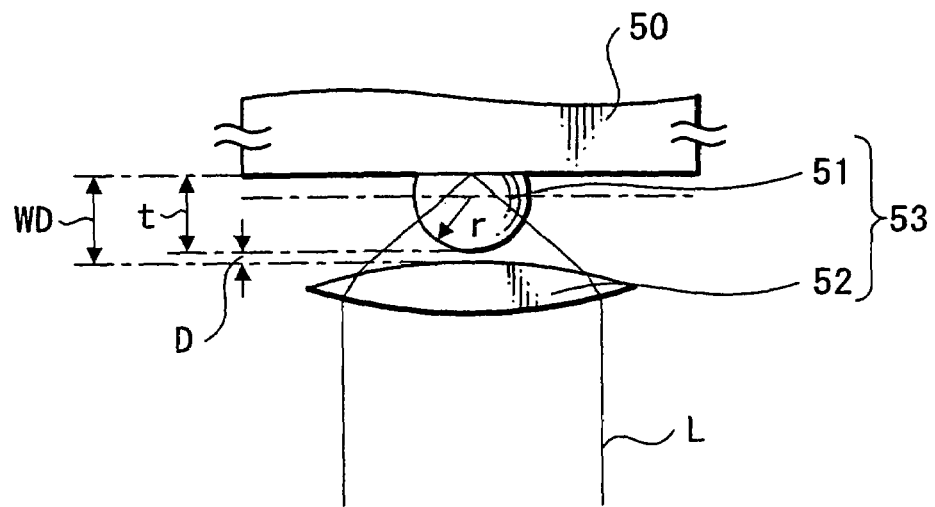
FIG. 12 is a schematic constitutional diagram showing a main part of the optical pickup having a condenser lens in the near-field optical recording/reproducing system.

The present invention is applicable not only to an optical pickup, the same as the structure shown in FIG. 12 for example, having a condenser lens composed of a first optical lens and a second optical lens which are arranged successively from an objective side, namely, an optical pickup using the so-called near-field optical recording/reproducing system, but also to an optical recording/reproducing apparatus comprising such an optical pickup.

Hereinafter, an embodiment when the present invention is applied to such optical pickup will be described.

Figure 2:
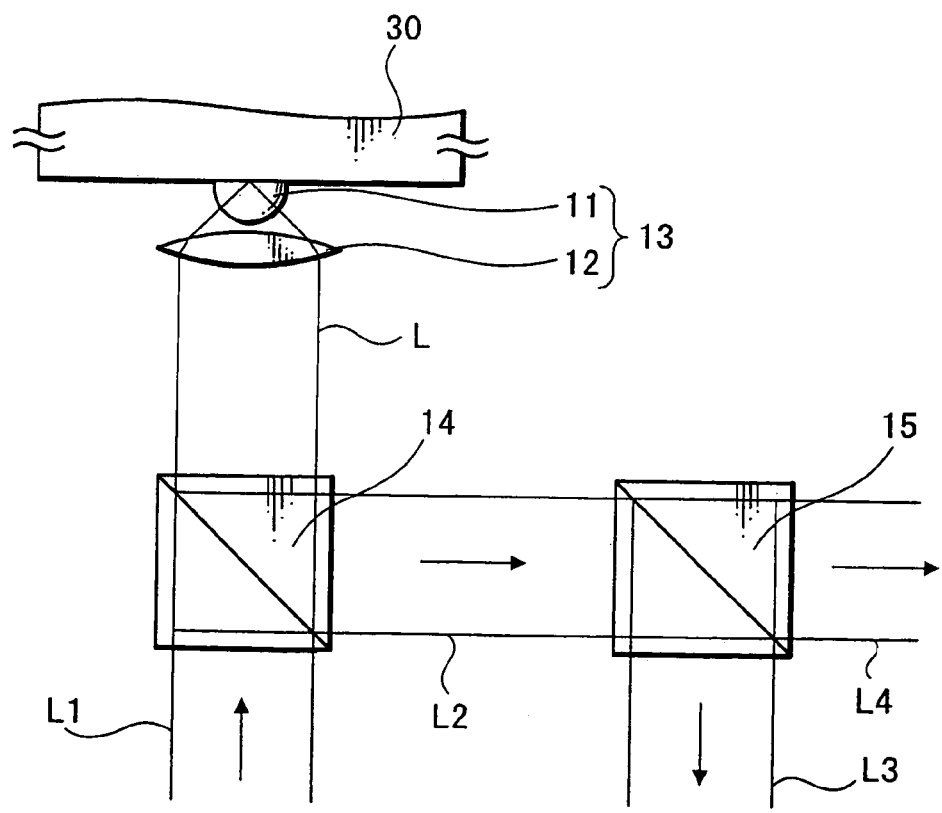
FIG. 2 is a diagram showing a form of optical system of the optical pickup in FIG. 1.

FIG. 1 shows a schematic constitutional diagram of a main part of the optical pickup according to the present invention. FIG. 2 shows a structural example of an optical system forming the optical pickup shown in FIG. 1.

As shown in FIGS. 1 and 2, the optical pickup includes a light source not shown in the figures, e.g. a semiconductor laser, a condenser lens 13 for condensing luminous flux L on a recording medium (an optical recording medium or a magneto-optical recording medium) 30, a first beam splitter 14 for separating luminous flux L1 emitted from the light source from luminous flux L2 reflected at the recording medium 30, and a second beam splitter 15 for dividing the luminous flux L2 reflected at the recording medium 30 into two luminous fluxes.

The condenser lens 13 is composed of the first optical lens 11 and the second optical lens 12 which are arranged sequentially from the side of recording medium 30 so that their optical axes may be aligned.

If the recording medium 30 is, e.g. a disc-shaped medium, the recording medium 30 will be mounted on a spindle motor to be rotated at a predetermined speed.

Additionally, although the first optical lens 11 and the recording medium 30 are actually not in contact with each other, because an interval between the optical lens 11 and the recording medium 30 is sufficiently small as compared with a thickness t of the optical lens 11 (e.g. about a several-ten-thousandth), they are drawn as if they contact with each other in FIG. 1 and FIG. 2. The same applies to the following drawings.

Next, light routes, operations of parts, etc. in the optical pickup shown in FIGS. 1 and 2 will be described.

Going light emitted from a light source, e.g. a semiconductor laser is converted into parallel light by a collimator lens (not shown). The luminous flux L1 of the going light penetrates the first beam splitter 14 and is condensed on an information-recording surface of the recording medium 30 through the condenser lens 13. Returning light reflected on the information-recording surface penetrates again the condenser lens 13 and is reflected by the first beam splitter 14 to form the luminous flux L2 entering the second beam splitter 15.

Returning light reflected by the second beam splitter 15 (light flux L3) is condensed on a not-shown light detector for tracking, where a tracking error signal is detected.

Returning light passing through the second beam splitter 15 (light flux L4) is condensed on another not-shown light detector for focusing, where a focusing error signal, a reproduction pit signal, etc. are detected.

Moreover, each of the optical pickups shown in FIGS. 1 and 2 is provided with means for controlling the condenser lens 13 to be driven in a tracking direction and in a focusing direction.

For example, a biaxial actuator used in a conventional optical pickup, a slider used in a magnetic head, etc. and the like can be such means.

Examples of these control/drive means for the condenser lens 13 will be described next.

Figure 3:
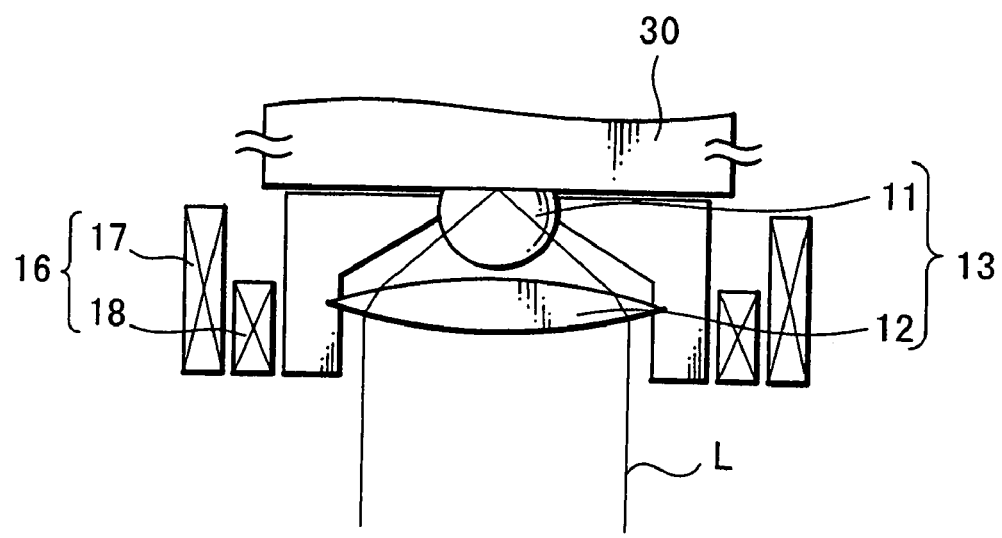
FIG. 3 is a schematic constitutional diagram where a biaxial actuator is employed for a control/drive means of the condenser lens in FIG. 1 and FIG. 2.

FIG. 3 shows a schematic constitutional diagram when a biaxial actuator is used as the control/drive means of the condenser lens 13 shown in FIGS. 1 and 2.

As is shown in FIG. 3, the condenser lens 13 (11, 12) is fixed to the biaxial actuator 16 composed of a coil 17 (for tracking) which controls the condenser lens 13 to be driven in a tracking direction and another coil 18 (for focusing) which controls the condenser lens to be driven in a focusing direction.

The biaxial actuator 16 is constructed to be able to control a distance between the recording medium 30 and the first optical lens 11. For example, by monitoring an amount of returning light to feed back a piece of distance information, the distance between the first lens 11 and recording medium 30 can be kept constant to avoid a collision between the first lens 11 and recording medium 30.

Furthermore, by monitoring the amount of returning light to feed back a piece of positional information, the biaxial actuator 16 can drive the tracking coil 17 to move the condenser lens 13 in a tracking direction and move the condensed light spot on a desired record track.

Figure 4:
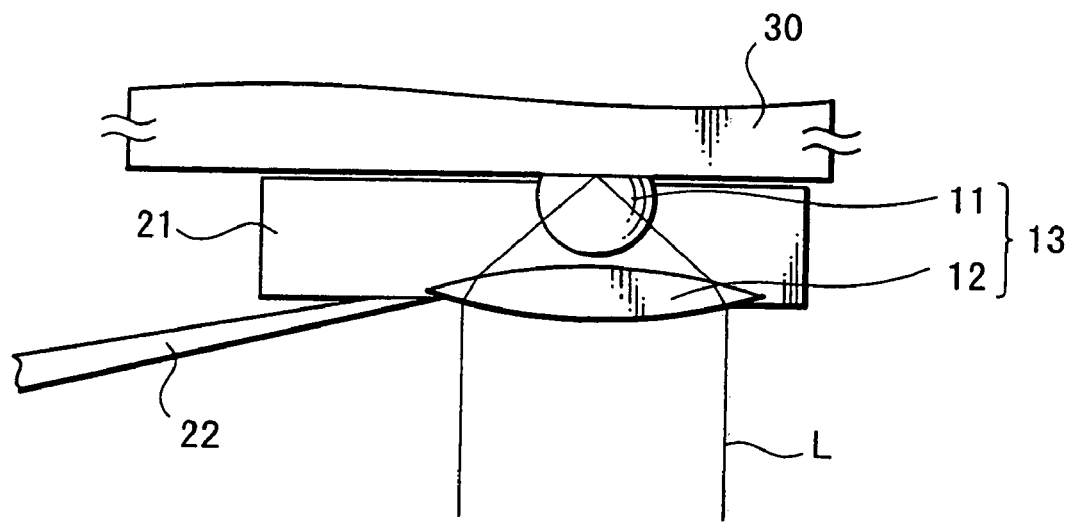
FIG. 4 is a schematic constitutional diagram where a slider is employed for a control/drive means of the condenser lens in FIG. 1 and FIG. 2.

Next, a schematic constitutional diagram when a slider is used as the control/drive means of the condenser lens 13 shown in FIGS. 1 and 2 is shown in FIG. 4.

As is shown in FIG. 4, the condenser lens 13 (11, 12) is fixed to a slider 21 which is controlled to be driven in the tracking direction.

The slider 21 is supported by an optical moving part (not shown) movable in the tracking direction through an elastic member, e.g. gimbals 22 which has elasticity only in a plane-contact direction on the recording medium 30. The optical moving part is controlled to be driven in the tracking direction by a control/drive means composed of a linear motor or the like.

A gas stream occurring with rotation of the recording medium 30 flows into a gap between the recording medium 30 and slider 21 to form a gas film which balances with a pressure of the gimbals 22 that is an elastic member on the recording medium 30. Thus, the slider 21 floats keeping a constant distance of, e.g. 50 nm relative to the recording medium 30.

In other words, when information is reproduced from the recording medium 30 or information is recorded on the recording medium 30 while the recording medium 30 is rotated at a predetermined speed, the distance between the first optical lens 11 forming the condenser lens 13 and the recording medium 30 is kept approximately constant by means of the slider 21.

In addition, if necessary, in order to correct a remaining focus error component when the biaxial actuator 16 or slider 21 holding the condenser lens 13 follows a plane shake of the recording medium 30, and an error component occurring in a process for assembling the condenser lens 13 (11, 12), a relay lens which can perform a correction by changing an interval between the two optical lenses 11 and 12 can be interposed between the first beam splitter 14 and the second optical lens 12.

Figure 5:
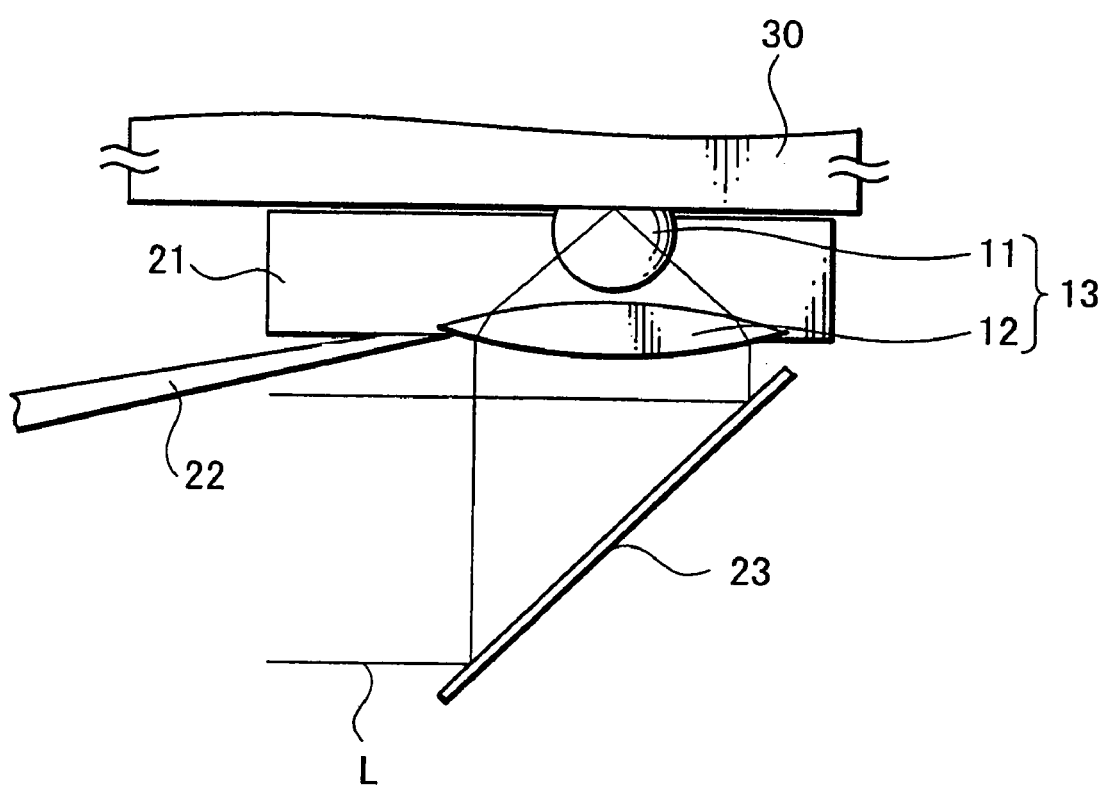
FIG. 5 is a schematic constitutional diagram where the slider is provided with a mirror.

Further, when the first optical lens 11 and the second optical lens 12 are fixed to the slider 21 as shown in FIG. 4, in order to correct a remaining focus error component as the slider 21 follows, and an error component occurring in a process for assembling the condenser lens, the first optical lens 11 of the two optical lenses forming the condenser lens 13 is fixed to the slider 21, whereas the second optical lens 12 can be arranged so as to be movable relative to the first optical lens 11, e.g. in an optical-axis direction by means of, e.g. a piezoelectric element and the like Moreover, in case of an optical recording/reproducing apparatus where the spindle motor has a means for mounting a plurality of optical recording media (a structure resembling a stack type of recording medium employed in a magnetic recording/reproducing apparatus such as a hard disc drive and the like), it is preferable for the slider 21 to be further provided with a mirror 23 which bends the optical axis by about ninety degrees, as shown in FIG. 5.

By utilizing such a structure, it is possible to reduce an interval between each of the optical recording media in an optical recording/reproducing apparatus, with the result that the optical recording/reproducing apparatus can be made smaller in size and thinner in thickness.

Next, a shape of the first optical lens 11 will be described.

A shape of the first optical lens 11 is not limited to the super-hemisphere shown in FIGS. 1 through 5, but the other shape can be taken.

Modified shapes of the first optical lens 11 will be shown below.

Figure 6:
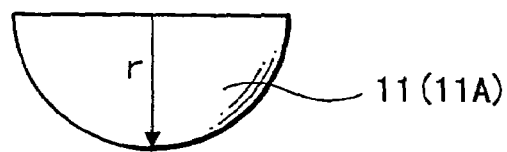
FIG. 6 is a diagram showing a shape of the first optical lens.

FIG. 6 shows a case where a hemispherical optical lens 11A is employed for the first optical lens 11. In this case, a thickness of the lens corresponds to its curvature radius r.

Figure 7:
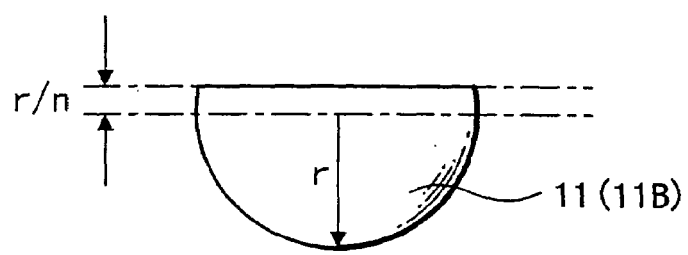
FIG. 7 is a diagram showing another shape of the first optical lens.

FIG. 7 shows a case where the same super-hemispherical optical lens 11B as in FIG. 1 is employed for the first optical lens 11. In this case, part of an upper half of a sphere having a thickness of r/n is added to the hemisphere, so that the thickness of the lens becomes r(1+1/n).

In these cases, each of their objective surfaces facing the recording medium 30 is a plane, whereas a surface opposite to the objective surface is a convex spherical surface. The optical lens 11 is fixed to the biaxial actuator 16 or the slider 21 in its circumferential side surface.

Figure 8:
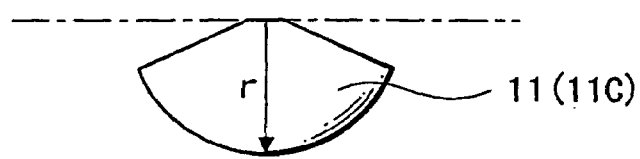
FIG. 8 is a diagram showing still another shape of the first optical lens.

Next, FIG. 8 shows a case where an optical lens 11C having a shape in which the objective surface of the hemisphere shown in FIG. 6 is worked into a conical shape is employed.

Figure 9:
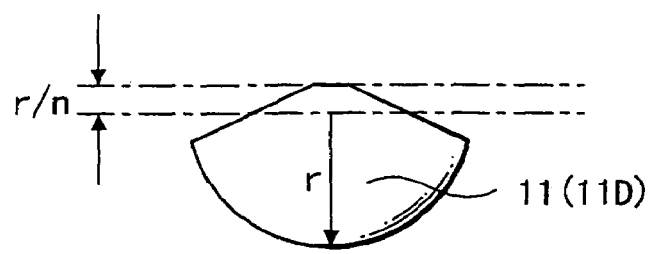
FIG. 9 is a diagram showing yet another shape of the first optical lens.

Further, FIG. 9 shows a case where an optical lens 11D having a shape in which the objective surface of the super-hemisphere shown in FIG. 7 is worked into a conical shape is employed.

In the near-field optical recording/reproducing system, because the recording medium 30 and the first optical lens 11 are very close to each other and a distance between them is as small as several tens nm or so, if the objective surface is thus worked into the conical shape, it is then possible to increase a tolerance to an inclination of the recording medium 30 or the first optical lens 11.

In addition, when a magneto-optical recording medium is employed for the recording medium 30 in the near-field optical recording/reproducing system, the magnetic field is necessary during recording and/or reproduction.

Figure 10:
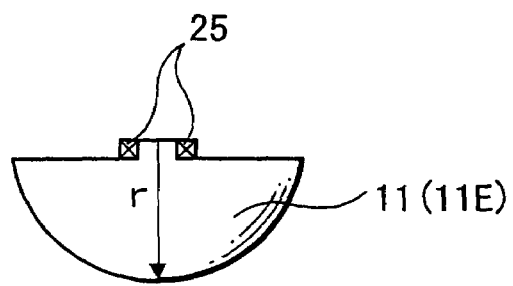
FIG. 10 is a diagram showing even another shape of the first optical lens.
Figure 11:
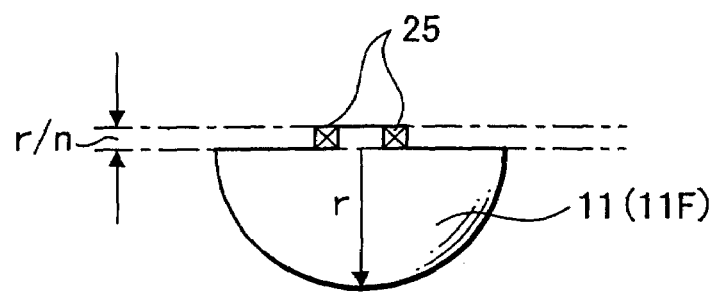
FIG. 11 is a diagram showing another different shape of the first optical lens.

In this case, as shown in FIG. 10 or FIG. 11, a magnetic-field-applying means such as a magnetic coil 25 can be fitted in part of the objective surface of the first optical lens 11.

FIG. 10 shows a case where the objective surface of a hemispherical optical lens 11E is worked so that its central part may be left for fitting the magnetic coil 25.

FIG. 11 shows a case where the objective surface of a super-hemispherical optical lens 11E is worked so that its central part may be left for fitting the magnetic coil 25.

In the optical pickup according to the present embodiment, when the above-described first structure of the present invention is employed, the light source is formed to emit light of wavelengths in the range of 390~450 nm, and also at least the first optical lens 11 on the side of recording medium 30 in the condenser lens 13 is formed of the above-described optical lens made of strontium titanate (the optical lens made of strontium titanate or mainly made of strontium titanate).

Additionally, material of the second optical lens 12 is not particularly limited, but any one of strontium titanate, glass, and other materials may be employed.

Subsequently, a sample made of strontium titanate was actually prepared and various characteristics thereof were examined.

PRACTICE EXAMPLE 1

A sample as an embodiment 1 was prepared by working a single crystal material A of $SrTiO_3$ (strontium titanate) produced using the Bernoulli method into one of 10 mm×10 mm in size and 2 mm in thickness, making Z-axis of its (100) plane and then optically grinding both the surfaces.

COMPARISON EXAMPLE 1

A sample as a comparison example 1 was prepared by working a high-refractive-index glass S-LAH79 material made by OHARA INC. into one of 10 mm×10 mm in size and 2 mm in thickness and then optically grinding both the surfaces.

Next, a refractive index of each sample of these embodiment 1 and comparison example 1 at wavelengths from 380 nm to 800 nm was measured by a spectroscopic ellipsometer VASE made by J. A. Woollam Japan Co., Inc. The dependence on wavelengths of refractive index of each sample of these practice example 1 and comparison example 1 is shown in FIG. 13 by comparison.

Figure 13:
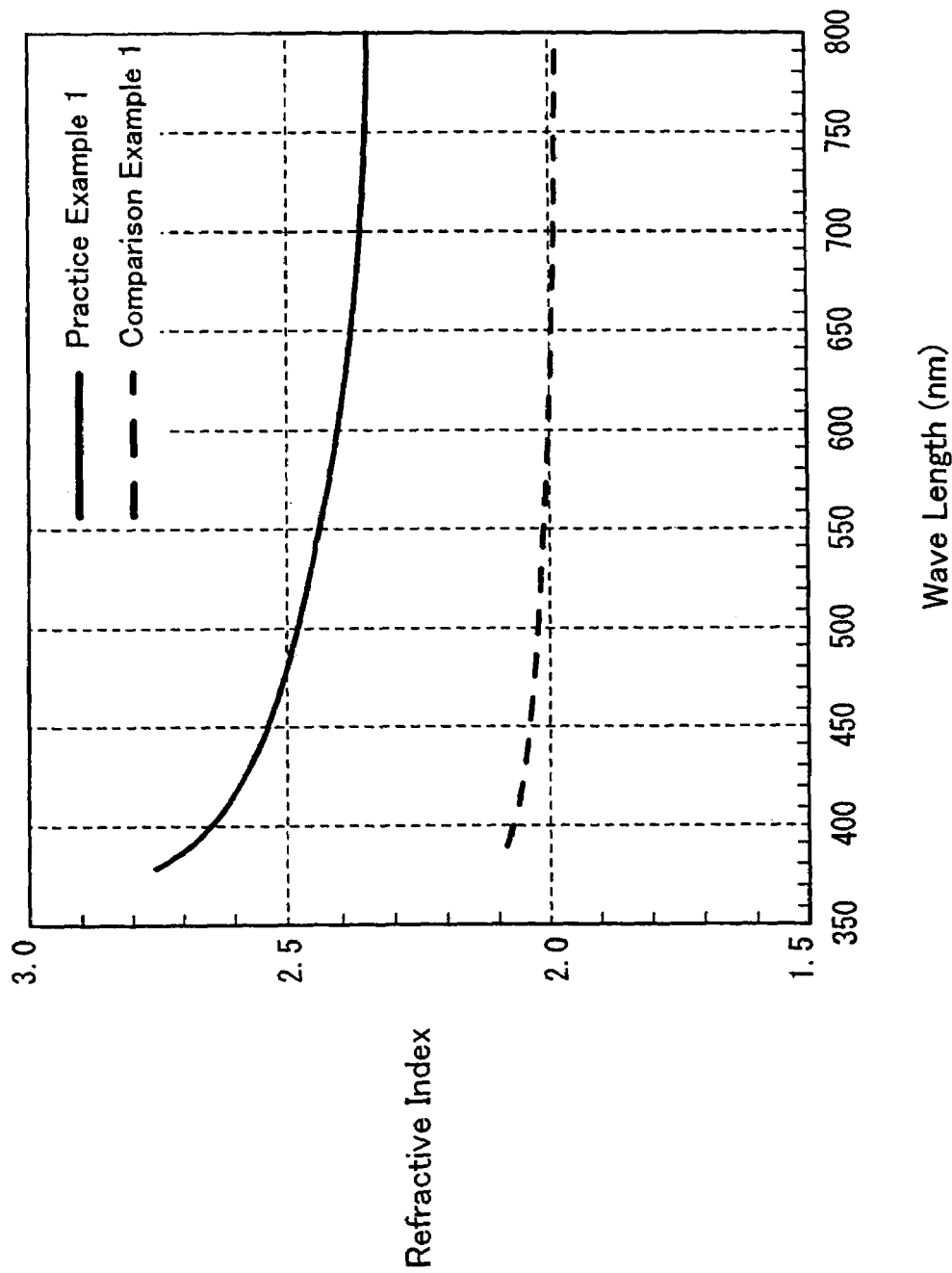
FIG. 13 is a diagram for comparing the dependence on wavelength of refractive index between a practice example 1 and a comparison example 1.

It can be seen from FIG. 13 that a refractive index of the glass material of the comparison example 1 ranges from 2.0 to 2.1 or so, whereas that of the $SrTiO_3$ material of practice example 1 greatly exceeds that of the glass material in the range of all wavelengths from 380 to 800 nm and the value reaches 2.6 or more at a wavelength of about 400 nm.

Further, a refractive index at a wavelength of 415 nm was measured respectively for each sample of the practice example 1 and comparison example 1.

Thereafter, based on the above measurement result of refractive indexes the first optical lenses made of the materials of practice example 1 and comparison example 1, respectively, were combined with the second optical lenses each having a numerical aperture of 0.45 to compose the condenser lenses 13, 53 as shown in FIG. 1 and FIG. 12, and then a numerical aperture of each condenser lens was calculated.

The result of measuring these refractive indexes and the result of calculating the numerical apertures of these condenser lenses are shown in Table 1.

TABLE 1

| Name of sample | Refractive index at wavelength of 415 nm | Numerical aperture of condenser lens |
| --- | --- | --- |
| Practice example 1 $SrTiO_3$ single crystal | 2.6146 | 3.08 |
| Comparison example 1 S-LAH79 | 2.0616 | 1.91 |

As is clearly seen from Table 1, in comparison with S-LAH79 having a high refractive index among glass materials, the refractive index of $SrTiO_3$ and the numerical aperture of condenser lens composed using the $SrTiO_3$ material are both far larger than those of glass materials.

Further, the area of a light spot condensed by a condenser lens can be reduced in inverse proportion to the square of a numerical aperture of the condenser lens.

Therefore, it is understood that $SrTiO_3$ can materialize an optical pickup device capable of recording on and reproducing from an optical recording medium 2.6 times higher in density than S-LAH79.

PRACTICE EXAMPLE 2

A sample as practice example 2 was prepared by working a single crystal material A of $SrTiO_3$ produced using the Bernoulli method into one of 10 mm×10 mm in size and 2 mm in thickness, making Z-axis of its (100) plane and then optically grinding both the surfaces.

COMPARISON EXAMPLE 2

A sample as comparison example 2 was prepared by working a single crystal material B of $SrTiO_3$ produced also using the Bernoulli method, whose absorption coefficient is increased by making shorter of a heat treatment time in oxygen atmosphere after growing crystal than that for the single crystal material A of $SrTiO_3$, into one of 10 mm×10 mm in size and 2 mm in thickness, making Z-axis of (100) plane and then optically grinding both the surfaces.

Next, a refractive index of each sample of these practice example 2 and comparison example 2 at wavelengths from 380 nm to 800 nm was measured by a spectroscopic ellipsometer VASE made by J. A. Woollam Japan Co., Inc.

Figure 14:
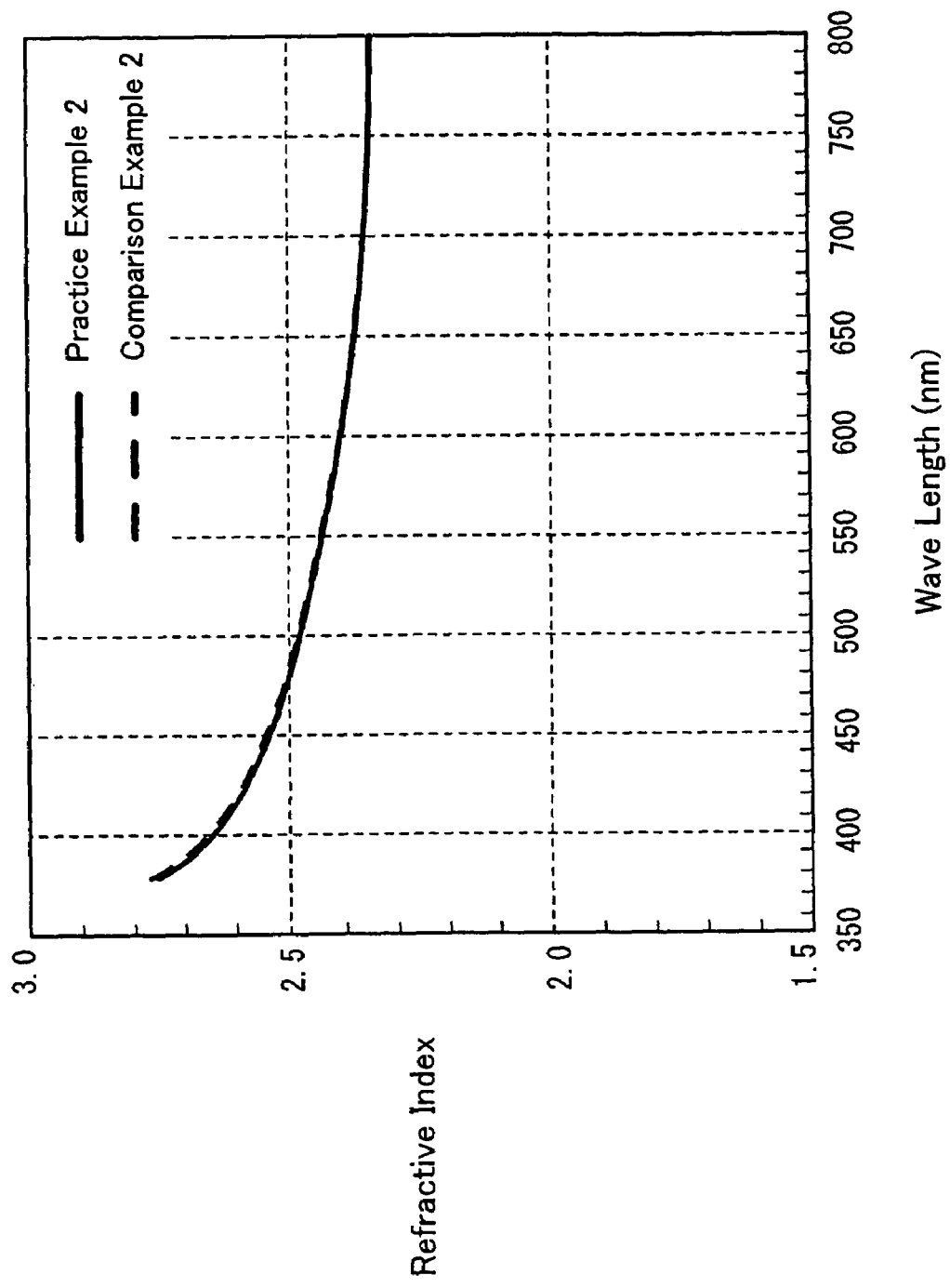
FIG. 14 is a diagram for comparing the dependence on wavelength of refractive index between a practice example 2 and a comparison example 2.

The dependence on wavelength of refractive indexes of practice example 2 and comparison example 2 is shown in FIG. 14 by comparison.

It can be seen from FIG. 14 that the dependence on wavelength of refractive indexes of practice example 2 and comparison example 2 is nearly equal in the range of all wavelengths from 380 nm to 800 nm and the value reaches 2.6 or more at a wavelengths of about 400 nm.

Figure 15:
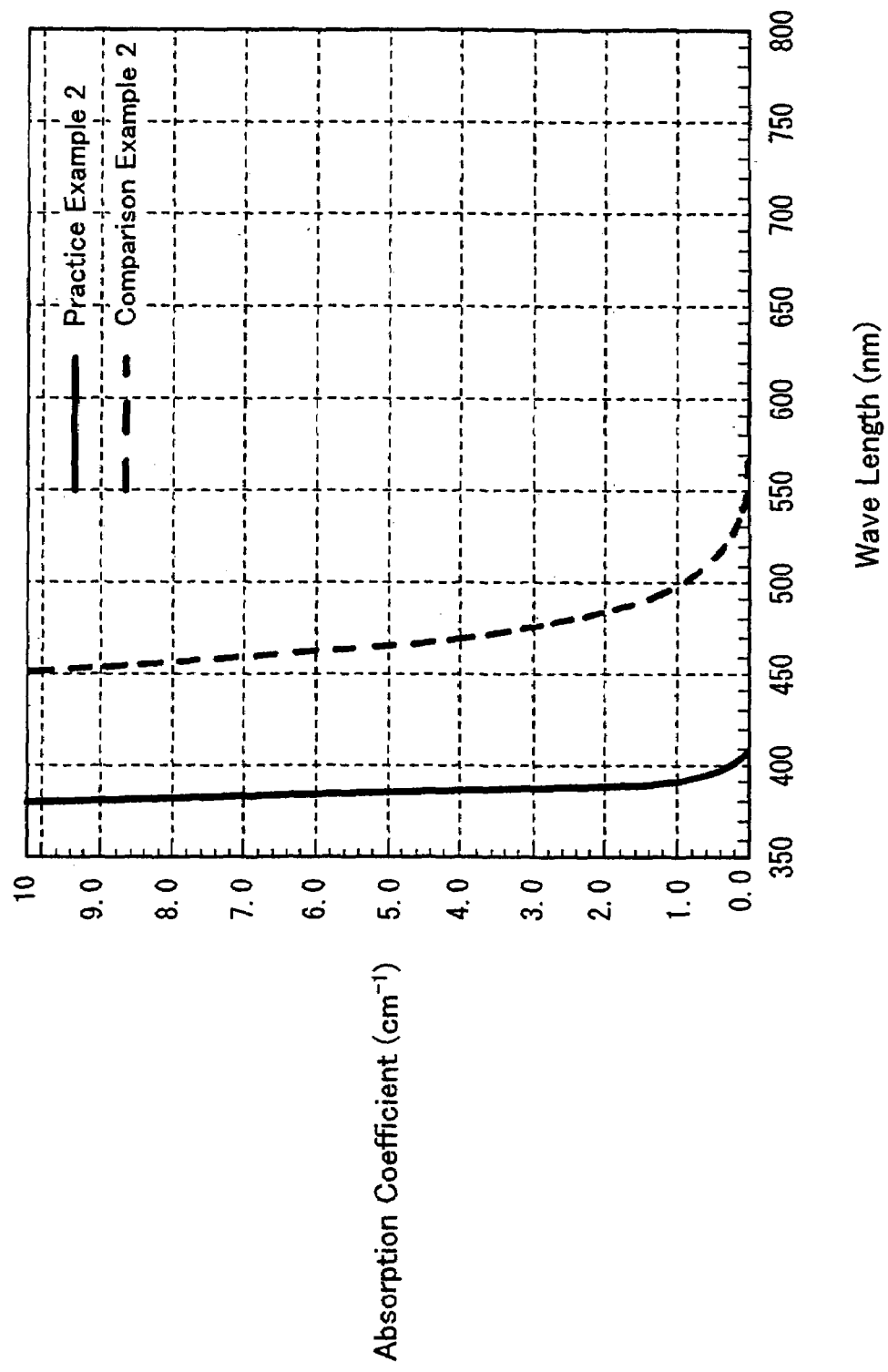
FIG. 15 is a diagram for comparing the dependence on wavelength of absorption coefficient between the practice example 2 and the comparison example 2.

Next, the dependence on wavelength of absorption coefficients of the practice example 2 and comparison example 2 is shown in FIG. 15 by comparison.

It can be seen from FIG. 15 that absorption coefficients of the practice example 2 and comparison example 2 greatly differ from each other at a wavelength of 500 nm or under, and that of comparison example 2 greatly increases at a wavelength of 500 nm or under.

This is because of short heat treatment time in an oxygen atmosphere after growing crystal of the comparison example 2. It is considered that, because oxygen deficit sites in the crystal could not completely combine with oxygen, a large number of the oxygen deficit sites remain in the crystal with the result that those oxygen deficit sites absorb a great deal of light at a wavelength of 500 nm or under in an ultraviolet region, thereby causing the absorbing coefficient to be increased.

Next, the samples of practice example 2 and comparison example 2 were respectively employed in the super-hemispherical first optical lens 11 which is 2 mm in thickness, and also glass material was employed in the second optical lens 12 to compose the condenser lens 13 as shown in FIG. 1. Subsequently, transmissivity of the thus composed condenser lens 13 at a wavelength of 415 nm was measured.

As to these practice example 2 and comparison example 2, absorption coefficients at a wavelength of 415 nm and transmissivities of the condenser lens 13 at a wavelength of 415 nm are shown in Table 2 by comparison.

TABLE 2

| Name of sample | Absorption coefficient at wavelength 415 nm $(cm^{-1})$ | Transmissivity of condenser lens at wavelength 415 nm (%) |
| --- | --- | --- |
| Practice example 2 $SrTiO_3$ single crystal A | 0.0 | 100 |
| Comparison example 2 $SrTiO_3$ single crystal B | 82.2 | 0.0 |

As is clearly seen from the Table 2, in comparison between the practice example 2 and comparison example 2, even though the dependence on wavelength of refractive index is the same, the dependence on wavelength of absorption coefficient is greatly different, so that the transmissivity of composed condenser lens becomes quite different.

Because the single crystal A of $SrTiO_3$ of practice example 2 has a small absorption coefficient, the transmissivity of condenser lens composed thereof could be made to be 100%.

However, the single crystal B of $SrTiO_3$ of comparison example 2 has a large absorption coefficient, so that no transmissivity could be obtained when the condenser lens is composed thereof.

Consequently, it is possible to realize an optical pickup and optical recording/reproducing apparatus capable of recording on and reproducing from an optical recording medium 2.6 times higher in density than when using an optical lens made of glass materials, by using the optical lens made of strontium titanate employing crystal materials controlled so that an absorption coefficient for wavelengths of light emitted from the light source, e.g. oscillation wavelengths of a GaN semiconductor laser from 390 nm to 450 nm may be 2 $cm^{-1}$ or less, preferably 0.1 $cm^{-1}$ or less.

Next, the following case is considered. In the structure of an optical pickup shown in FIG. 1, two lenses of the condenser lens 13, i.e. the first optical lens 11 and the second optical lens 12 are both formed of a single crystal of strontium titanate having a refractive index of 2.61 to a wavelengths of 415 nm, and then the near-field recording and reproduction is performed while a distance between the first optical lens 11 and recording medium 30 is kept at, e.g. 40 nm. Additionally, the first optical lens 11 is formed of a super-hemispherical solid immersion lens (SIL).

At this time, if a numerical aperture of the second optical lens 12 is 0.45, then a numerical aperture of the condenser lens 13 will be 3.066.

Where a distance between the second optical lens 12 and recording medium 30 is WD, a thickness of the first optical lens being t, and a curvature radius of the convex spherical surface of the first optical lens 11 being r, a condition of $t=r(1+1/n)=1.3831r<WD$ must be satisfied. This condition is relaxed as compared with a case where the first optical lens is made of glass materials (1.5r<WD), so that a sufficient distance between the second optical lens 12 and recording medium 30 can be secured with ease.

Incidentally, in the structure of optical pickup of the near-field optical recording/reproducing system shown in FIG. 1 and FIG. 12, the above-described single crystal of $SrTiO_3$ of practice example 1 and S-LAH79 (glass) of comparison example 1 were employed respectively in the first optical lens 11 and 51 for comparison.

A refractive index at a wavelength of 415 nm and a numerical value of an element (1+1/n) relating to the thickness $t=r(1+1/n)$ of the first optical lens 11, 51 were respectively compared between the practice example 1 and comparison example 1. The result is shown in Table 3.

TABLE 3

| Name of sample | Refractive index at wavelength 415 nm | Numerical value of (1 + 1/n) |
|---|---|---|
| Practice example 1 SrTiO$_3$ single crystal | 2.6146 | 1.3825 |
| Comparison example 1 S = LAH79 | 2.0616 | 1.4851 |

As shown in Table 3, the numerical value of (1+1/n) is 1.3825 for practice example 1 and 1.4851 for comparison example 1. As can be seen from this comparison, when employing the single crystal of SrTiO$_3$ in practice example 1, because it has a large refractive index (2.6146), it is possible to reduce the thickness t of the first optical lens 11 by about 7% as compared with the glass material employed in comparison example 1.

This means that it is possible to implement the near-field recording and reproduction by the super-hemispherical lens having a thickness nearer to a hemispherical lens.

Therefore, as shown in FIG. 1, a sufficient distance WD between the second optical lens 12 and recording medium 30 can be secured, and also a diameter of the luminous flux L incident on the second optical lens 12 can be reduced with ease.

This makes it possible to reduce a thickness of the first optical lens 11 as well as a diameter of the first optical lens 11 and second optical lens 12, so that these first and second optical lenses 11, 12 can be reduced in weight and in turn the condenser lens 13 composed of the first and second optical lenses 11, 12 can be reduced in weight.

Thus, because the weight of condenser lens 13 controlled to be driven in a focusing direction and in a tracking direction on recording medium 30 is small, it is possible to improve servo characteristics such as a focus servo, a tracking servo and a seek time, and make the optical pickup and optical recording/reproducing apparatus smaller in size and thinner in thickness.

In the optical pickup according to the present embodiment, when the above-described second structure of the present invention is employed, the light source is formed to emit light of wavelengths in the range of 190~450 nm, and also at least the first optical lens 11 on the side of recording medium 30 in the condenser lens 13 is formed of the above-described optical lens made of high-refractive-index optical materials (an optical lens made of the above-described optical material or mainly made of that optical material).

Additionally, materials of the second optical lens 12 is not particularly limited and any one of the above-described high-refractive-index optical material, glass, plastics and other materials may be employed.

Subsequently, various characteristics of the above-described high-refractive-index optical material were examined.

PRACTICE EXAMPLE 3 AND COMPARISON EXAMPLE 3

HfO$_2$ material was employed for practice example 3 and SiO$_2$ material was employed for comparison example 3.

Figure 16:
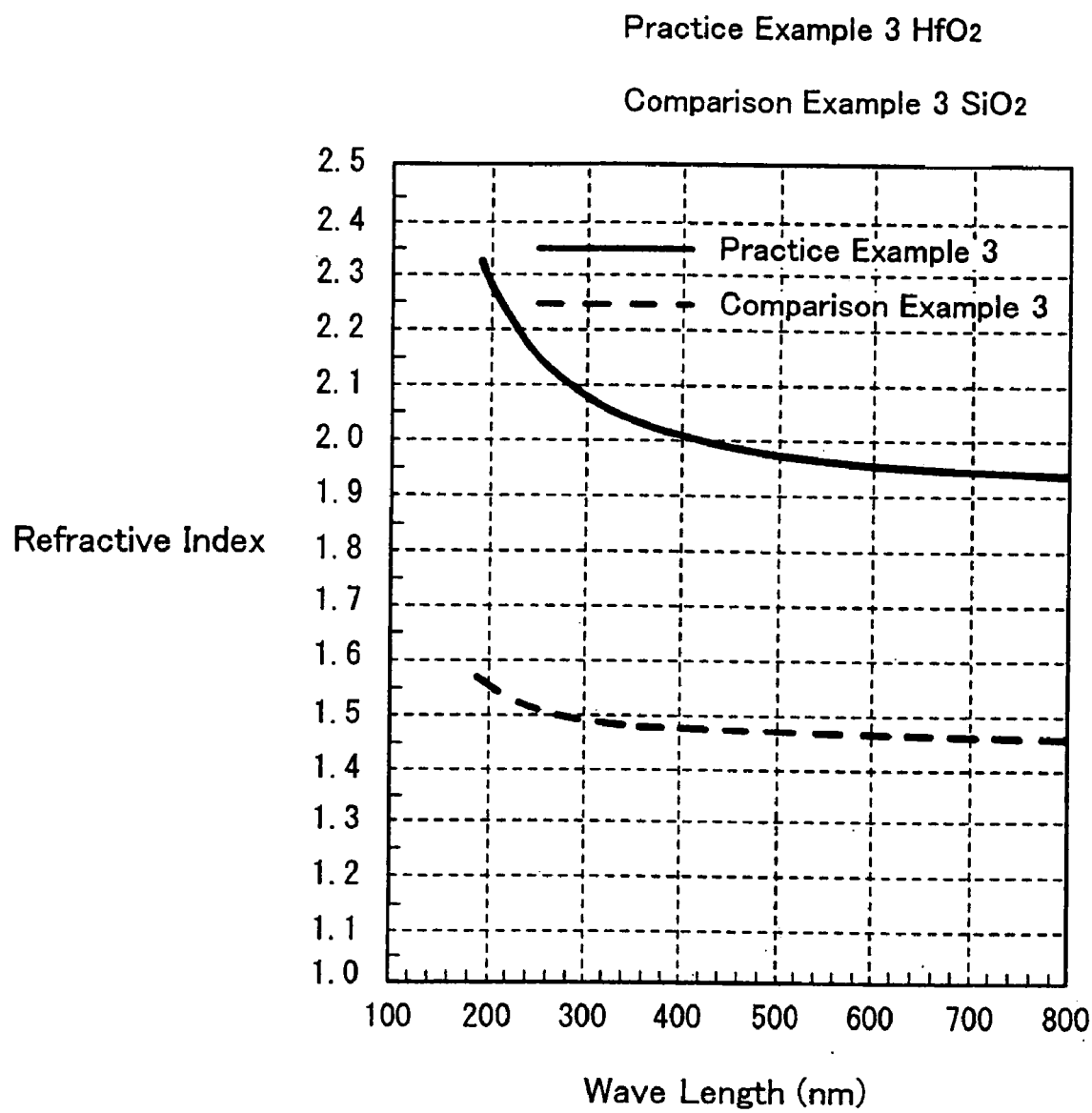
FIG. 16 is a diagram for comparing the dependence on wavelength of refractive index between a practice example 3 and a comparison example 3.

The dependence on wavelength of refractive indexes of these practice example 3 and comparison example 3 is shown in FIG. 16 by comparison. FIG. 16 shows those in the range of wavelengths from 190 nm to 800 nm.

It can be seen from FIG. 16 that a refractive index of HfO$_2$ material in practice example 3 exceeds 1.9 in the range of all wavelengths from 190 nm to 800 nm, and the value reaches 2.1 or over at a wavelength near 265 nm.

However, a refractive index of SiO$_2$ material in comparison example 3 is about 1.5 in the range of all wavelengths from 190 nm to 800 nm, and the value at a wavelength near 265 nm is 1.50.

Figure 17:
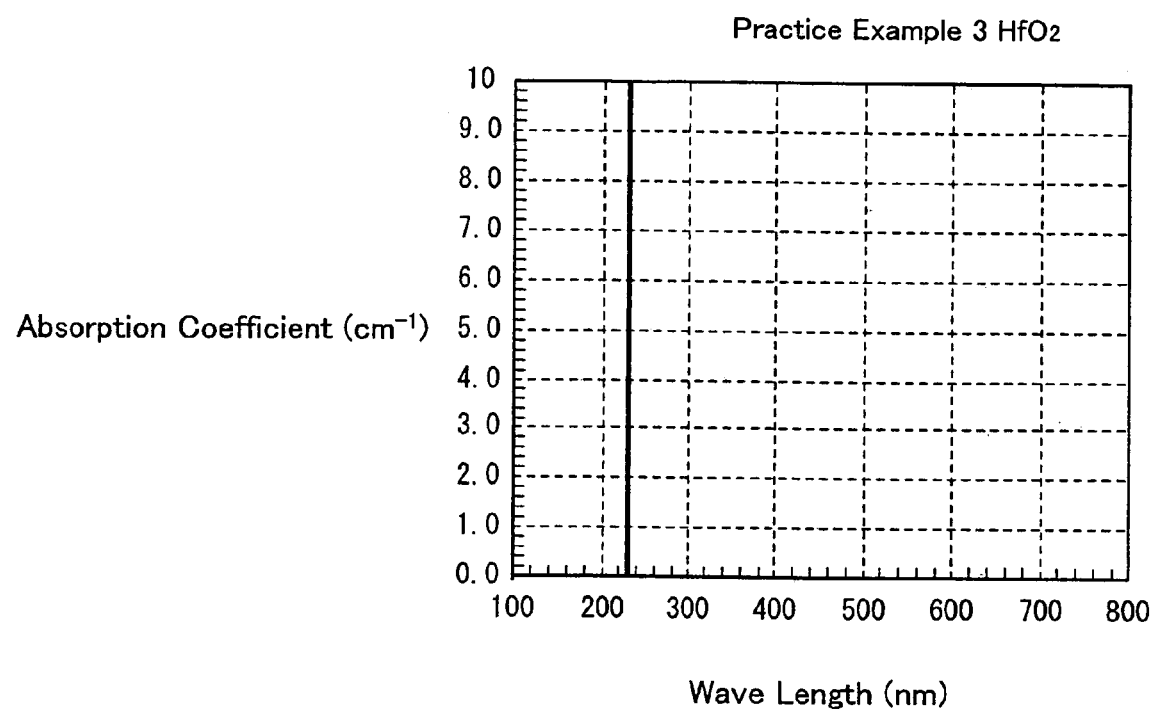
FIG. 17 is a diagram showing the dependence on wavelength of absorption coefficient in the practice example 3.

Furthermore, the dependence on wavelength of absorption coefficient of HfO$_2$ material in practice example 3 is shown in FIG. 17.

It can be seen from FIG. 17 that an absorption coefficient of HfO$_2$ material in practice example 3 is 0.1 cm$^{-1}$ or less on the side of all wavelengths longer than 215 nm, which leads to an excellent light permeability (light transmissivity), thus allowing light efficiency in recording and reproduction to light power from light source to be enhanced.

Further, refractive indexes of the practice example 3 and comparison example 3 at a wavelength of 265 nm were measured. Based on the refractive indexes, the materials of practice example 3 and comparison example 3 were respectively employed in the first optical lenses and these first optical lenses were each combined with the second optical lenses each having a numerical aperture of 0.45 to compose the condenser lenses 13, 53 as shown in FIG. 1 and FIG. 12. Numerical apertures of the condenser lenses thus composed were calculated.

These refractive indexes and numerical apertures of the condenser lenses are shown in Table 4.

Moreover, refractive indexes and numerical apertures of the condenser lenses when HfO$_2$—Y$_2$O$_3$, HfO$_2$—TiO$_2$, HfO$_2$—Sc$_2$O$_3$, HfO$_2$—Nd$_2$O$_3$, HfO$_2$-Ln$_2$O$_3$ which are optical materials of HfO$_2$ plus other material were respectively employed for materials of optical lenses are also shown in Table 4.

TABLE 4

| Name of sample | Refractive index at wavelength 265 nm | Numerical aperture of condenser lens |
|---|---|---|
| Practice example 3 HfO$_2$ | 2.12 | 2.03 |
| Comparison example 3 SiO$_2$ | 1.50 | 1.01 |
| HfO$_2$—Y$_2$O$_3$ | 1.94 | 1.69 |
| HfO$_2$—TiO$_2$ | 2.32 | 2.41 |
| HfO$_2$—Sc$_2$O$_3$ | 1.92 | 1.65 |
| HfO$_2$—Nd$_2$O$_3$ | 1.94 | 1.69 |
| HfO$_2$—Ln$_2$O$_3$ | 2.05 | 1.89 |

As is clearly be seen from Table 4, as compared with the conventional SiO$_2$ material, refractive indexes of HfO$_2$, HfO$_2$—Y$_2$O$_3$, HfO$_2$—TiO$_2$, HfO$_2$—Sc$_2$O$_3$, HfO$_2$—Nd$_2$O$_3$, HfO$_2$-Ln$_2$O$_3$ and numerical apertures of the condenser lenses fabricated using these materials are evidently larger.

The area of a light spot condensed by the condenser lens can be reduced in inverse proportion to the square of numerical aperture of the condenser lens.

Therefore, it can be seen that HfO$_2$ makes it possible to realize an optical pickup device capable of recording on and reproducing from an optical recording medium that are 2.0 times higher in density than when SiO$_2$ is employed.

PRACTICE EXAMPLE 4~PRACTICE EXAMPLE 10

$WO_3$ material was employed for practice example 4, $Sc_2O_3$ material for practice example 5, MgO material for practice example 6, $Y_2O_3$ material for practice example 7, $Gd_2O_3$ material for practice example 8, $Eu_2O_3$ material for practice example 9, and $Dy_2O_3$ material for practice example 10, respectively.

Figure 18A:
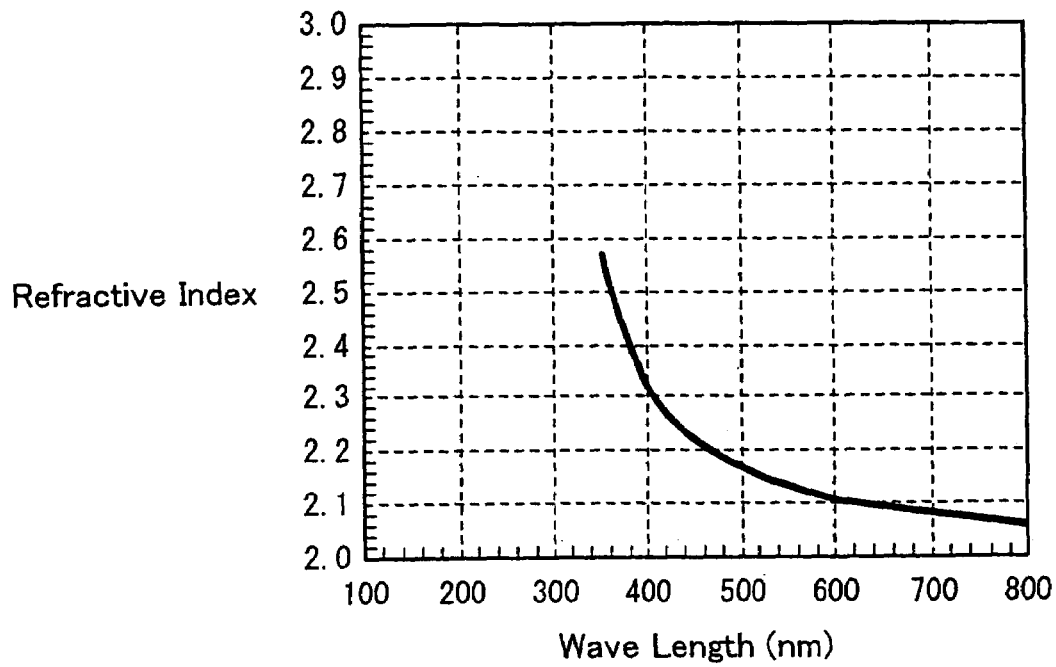
FIG. 18A is a diagram showing the dependence on wavelength of refractive index in a practice example 4.
Figure 18B:
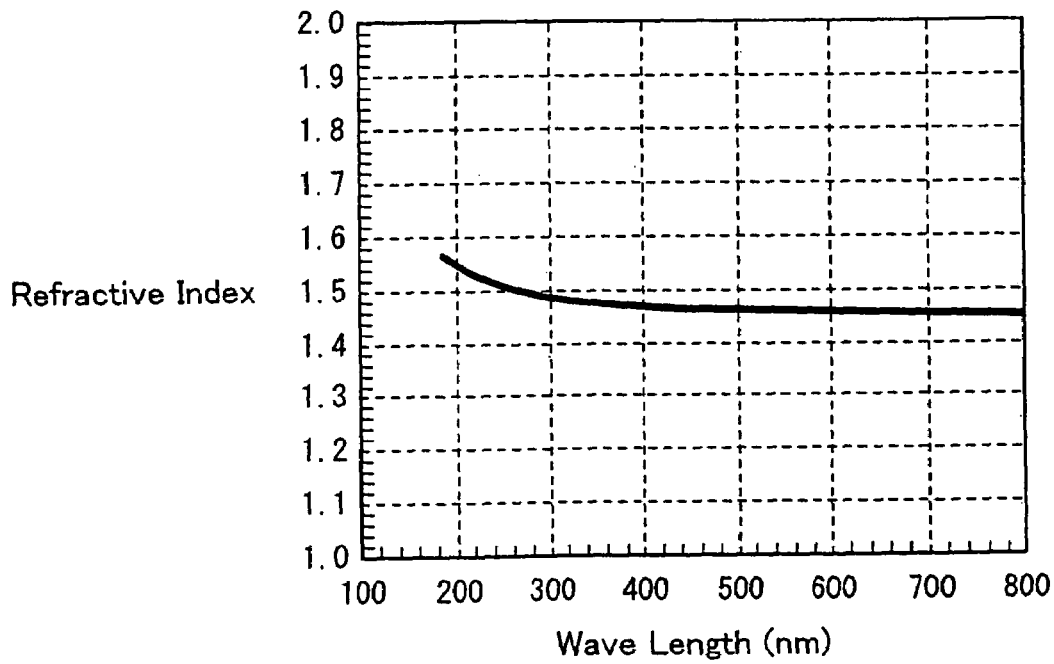
FIG. 18B is a diagram showing the dependence on wavelength of refractive index in the comparison example 3.

First of all, the dependence on wavelength of refractive index of $WO_3$ material in practice example 4 is shown in FIG. 18A. Also, for comparison, the dependence on wavelength of refractive index of $SiO_2$ material in the foregoing comparison example 3 is shown in FIG. 18B.

FIG. 18A shows that the refractive index of $WO_3$ material in practice example 4 exceeds 2.0 in the range of all wavelengths from 190 nm to 800 nm, and the value reaches 2.3 at a wavelength of about 400 nm. In contrast, FIG. 18B shows that the refractive index of $SiO_2$ material in comparison example 3 is 1.5 or so in the range of all wavelengths from 190 nm to 800 nm, and the value at a wavelength of 400 nm is 1.47.

Further, as to each of the practice examples 4 to 10 and comparison example 3, the refractive index at a wavelength of 400 nm was measured. Based on these refractive indexes, the first optical lenses for which the materials of practice examples 4 to 10 and comparison example 3 were respectively employed and the second optical lenses each having a numerical aperture of 0.45 were combined with each other to compose the condenser lens 13, 53 as shown in FIG. 1 and FIG. 12. Numerical apertures of the thus composed condenser lenses were then calculated.

These refractive indexes and numerical apertures of condenser lenses are shown in table 5.

TABLE 5

| Name of sample | Refractive index at wavelength 400 nm | Numerical aperture of condenser lens |
| --- | --- | --- |
| Practice example 4 $WO_3$ | 2.31 | 2.40 |
| Practice example 5 $Sc_2O_3$ | 1.85 | 1.54 |
| Practice example 6 MgO | 1.71 | 1.32 |
| Practice example 7 $Y_2O_3$ | 1.85 | 1.54 |
| Practice example 8 $Gd_2O_3$ | 1.88 | 1.59 |
| Practice example 9 $Eu_2O_3$ | 1.90 | 1.62 |
| Practice example 10 $Dy_2O_3$ | 1.86 | 1.56 |
| Comparison example 3 $SiO_2$ | 1.47 | 0.97 |

As is clear from Table 5, refractive indexes of each of materials $WO_3$, $Sc_2O_3$, MgO, $Y_2O_3$, $Gd_2O_3$, $Eu_2O_3$, $Dy_2O_3$ and numerical apertures of condenser lenses composed of these materials are evidently larger as compared with $SiO_2$ material.

The area of a light spot condensed by the condenser lens can be reduced in inverse proportion to the square of numerical aperture of the condenser lens.

Accordingly, if the wavelengths of light emitted from light source in an optical recording/reproducing apparatus are set in the range of, e.g. the oscillation wavelengths of a GaN semiconductor laser from 390 nm to 420 nm, then, for example, $WO_3$ can materialize an optical pickup device capable of recording on and reproducing from an optical recording medium that is 2.4 times higher in density than $SiO_2$. Also, for example, $Sc_2O_3$ can materialize an optical pickup device capable of recording on and reproducing from a recording medium that is 1.5 times higher in density than $SiO_2$.

Next, the following case is considered. In the structure of an optical pickup shown in FIG. 1, two lenses of the condenser lens 13, i.e. the first optical lens 11 and the second optical lens 12 are both formed of $HfO_2$ having a refractive index of 2.12 to a wavelength of 265 nm, and the near-field recording and reproduction is performed while a distance between the first optical lens 11 and recording medium 30 is kept at, e.g. 40 nm. Additionally, the first optical lens 11 is formed of a super-hemispherical solid immersion lens (SIL).

On this occasion, if a numerical aperture of the second optical lens 12 is 0.45, a numerical aperture NA of the condenser lens 13 is 2.03 from Table 4.

Where a distance between the second optical lens 12 and recording medium 30 is WD, a thickness of the first optical lens 11 being t, and a curvature radius of the convex spherical surface of the first optical lens 11 being r, a condition of $t=r(1+1/n)=1.472r<WD$ must be satisfied. This condition is relaxed as compared with a condition $(1.667r<WD)$ when the first optical lens is made of glass material ($SiO_2$), so that a sufficient distance between the second optical lens 12 and recording medium 30 can be secured with ease.

Incidentally, in the structure of the optical pickup of the near-field optical recording/reproducing system as shown in FIG. 1 and FIG. 12, the above-described $HfO_2$ material of practice example 3 and $SiO_2$ (glass) material of comparison example 3 were employed in the super-hemispherical first optical lenses 11 and 51 respectively for comparison.

As to the practice example 3 and comparison example 3, refractive indexes at a wavelength of 265 nm and numerical values of an element $(1+1/n)$ relating to thickness $t=r(1+1/n)$ of the first optical lenses 11, 51 are shown in Table 6 by comparison.

TABLE 6

| Name of sample | Refractive index at wavelength 265 nm | Numerical value of $(1 + 1/n)$ |
| --- | --- | --- |
| Practice example 3 $HfO_2$ | 2.12 | 1.472 |
| Comparison example 3 $SiO_2$ | 1.50 | 1.667 |

As is shown in Table 6, the numerical value of $(1+1/n)$ for practice example 3 is 1.472, and that for comparison example 3 is 1.667. As is seen from this comparison,-$HfO_2$ in practice example 3 can reduce the thickness t of the first optical lens 11 by about 12% relative to glass ($SiO_2$) in comparison example 3 because $HfO_2$ has a high refractive index (2.12).

This means that the near-field recording and reproduction by the super-hemispherical lens having a thickness nearer to a hemispherical lens can be implemented.

Therefore, as shown in FIG. 1, a sufficient distance WD between the second optical lens 12 and recording medium 30 can be secured and also a diameter of the luminous flux L incident on the second optical lens 12 can be reduced with ease.

This makes it possible to reduce a thickness of the first optical lens 11 as well as diameters of the first optical lens 11 and the second optical lens 12, so that these first and second optical lenses 11, 12 can be reduced in weight and in turn the condenser lens 13 composed of the first and second optical lenses 11, 12 can be reduced in weight.

Thus, because the weight of condenser lens 13 controlled to be driven in a focus direction and in a tracking direction on the recording medium 30 becomes small, it is possible to improve servo characteristics such as a focus servo, a tracking servo, a seek time and the like, and make an optical pickup and optical recording/reproducing apparatus smaller in size and thinner in thickness.

Moreover, when the above-described third structure of the present invention is employed in the optical pickup according to the present embodiment, a light source is formed so as to emit light of wavelengths in the range of 100~420 nm, and also at least the first optical lens 11 on the side of recording medium 30 in the condenser lens 13 is formed by the above-described optical lens made of fluoride optical material (the optical lens made of the above-described optical material or mainly made of that optical material).

In addition, material of the second optical lens 12 is not limited to a particular one and any lens made of the above-described fluoride optical materials, glass, plastics, and other materials may be available.

Successively, various characteristics of the above-described fluoride optical materials were examined.

PRACTICE EXAMPLE 11

$BaF_2$ material was prepared as a practice example 11.

Figure 19A:
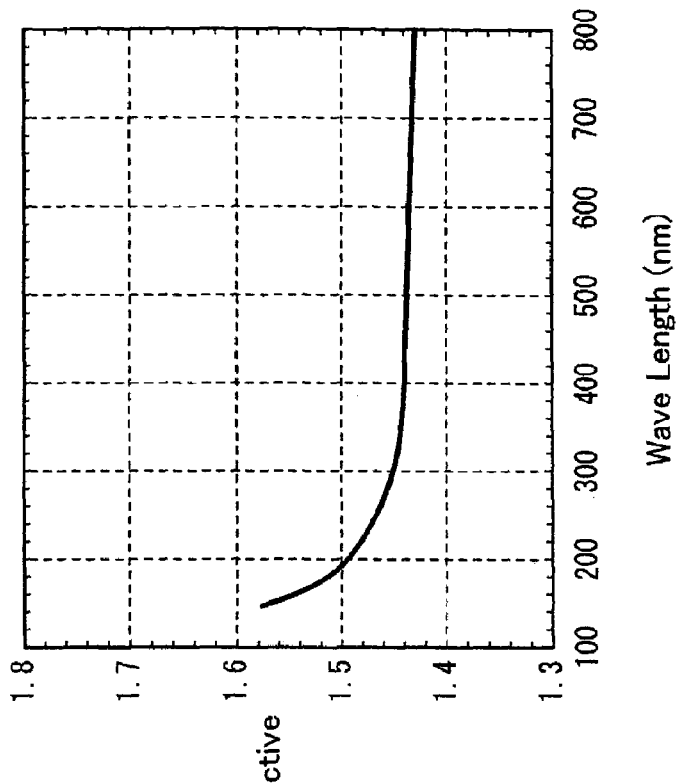
FIG. 19A is a diagram showing the dependence on wavelength of refractive index in a practice example 11.

The dependence on wavelength of refractive indexes of the practice example 11 is shown in FIG. 19A. FIG. 19A shows those in the range of 200 nm to 800 nm.

It is seen from FIG. 19A that refractive indexes of $BaF_2$ material in practice example 11 exceed 1.4 in the range of all wavelengths from 200 nm to 800 nm and the value reaches 1.5 or more at a wavelength near 300 nm.

Moreover, $BaF_2$ material of practice example 11 has an excellent light permeability (light transmissivity) on the side of wavelengths longer than 200 nm, thereby allowing light efficiency in optical recording and reproduction with respect to power of light from light source to be enhanced.

Furthermore, a refractive index of practice example 11 at a wavelength of 265 nm was measured. Based on the refractive index, the first optical lens 11 made of the material of practice example 11 were combined with the second optical lens 12 having a numerical aperture of 0.60 to compose the condenser lens 13 as shown in FIG. 1. Thereupon, a numerical aperture of the condenser lens 13 thus composed was calculated.

As a result, the refractive index at the wavelength of 265 nm was 1.51 and the numerical aperture of condenser lens was 1.37.

This means that, by composing the condenser lens 13 using $BaF_2$ material of practice example 11 in the first optical lens 11, it is possible to realize an optical pickup and optical recording/reproducing apparatus in the near-field optical recording/reproducing system, where a numerical aperture of the condenser lens is 1 or more.

In addition, the area of a light spot condensed by the condenser lens can be reduced in inverse proportion to the square of a numerical aperture of the condenser lens.

Therefore, it can be seen that $BaF_2$ material can materialize an optical pickup device capable of recording on and reproducing from an optical recording medium higher in density.

PRACTICE EXAMPLE 12 TO PRACTICE EXAMPLE 14

$CaF_2$ material was prepared for practice example 12, LiF material for practice example 13, and NaF material for practice example 14, respectively.

Figure 19B:
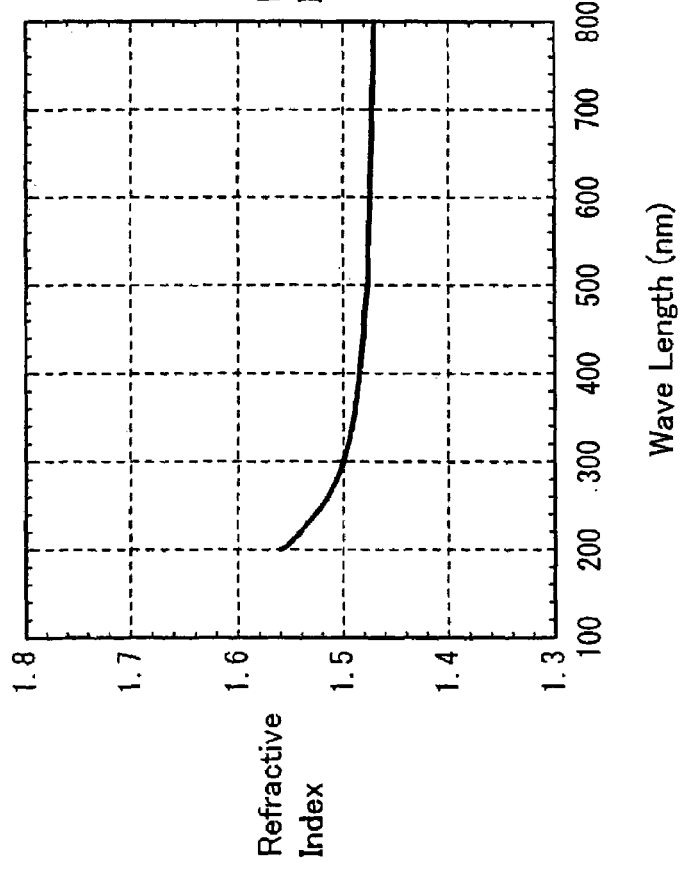
FIG. 19B is a diagram showing the dependence on wavelength of refractive index in a practice example 12.
Figure 20A:
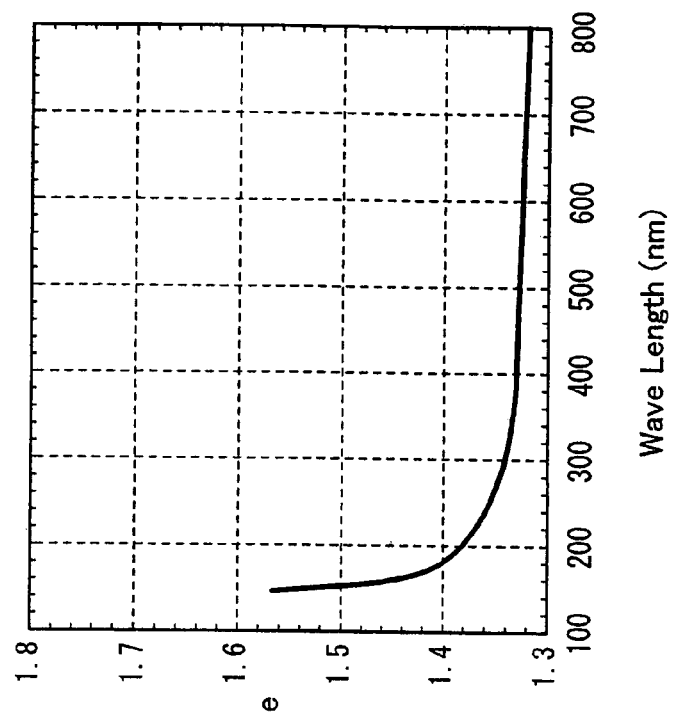
FIG. 20A is a diagram showing the dependence on wavelength of refractive index in a practice example 13.
Figure 20B:
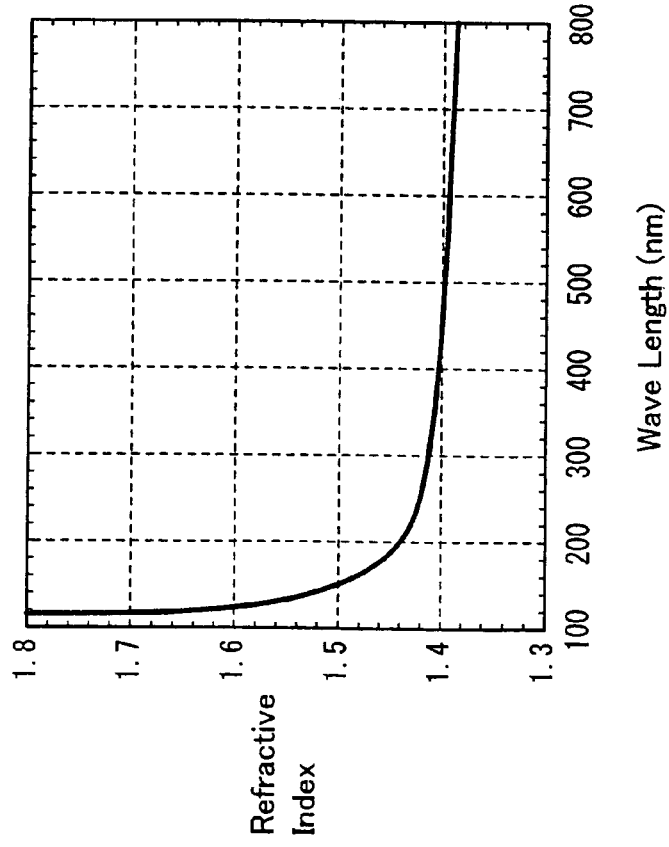
FIG. 20B is a diagram showing the dependence on wavelength in a practice example 14.

First of all, the dependence on wavelength of a refractive index of $CaF_2$ material in practice example 12 is shown in FIG. 19B; the dependence on wavelength of a refractive index of LiF material in practice example 13 is shown in FIG. 20A; the dependence on wavelength of a refractive index of NaF material in practice example 14 is shown in FIG. 20B.

It can be seen from FIG. 19B, FIG. 20A and FIG. 20B that a refractive index of each material in these practice examples 12 to 14 exceeds 1.3 in all the range of wavelengths from 150 nm to 800 nm and the value increases at a wavelength of 400 nm or under. Thus, as wavelengths of light emitted from a light source becomes shorter, those materials will be more preferable ones of optical lens.

Also, a refractive index of materials in each of practice examples 12 to 14 at a wavelength of 265 nm was measured. Based on the refractive index, the first optical lenses 11 made of the materials in practice examples 12 to 14 were respectively combined with the second optical lenses 12 having a numerical aperture of 0.60 to compose the condenser lenses 13 as shown in FIG. 1. Thereupon, a numerical aperture of the condenser lens 13 thus composed was calculated.

These refractive indexes and numerical apertures of the condenser lenses are shown in Table 7. The case of $BaF_2$ material in practice example 11 is also shown in Table 7.

TABLE 7

| Name of sample | Refractive index at wavelength 265 nm | Numerical aperture of condenser lens |
| --- | --- | --- |
| Practice example 11 $BaF_2$ | 1.51 | 1.37 |
| Practice example 12 $CaF_2$ | 1.46 | 1.28 |
| Practice example 13 LiF | 1.41 | 1.19 |
| Practice example 14 NaF | 1.35 | 1.09 |

As is clear from Table 7, when each material in the practice examples 12 to 14 is employed, it is also possible to make 1 or more of a numerical aperture of the condenser lens, thereby enabling an optical pickup device capable of recording on and reproducing from an optical recording medium higher in density to be realized.

This means that, by employing each of the optical materials in practice examples 12 to 14 for the first optical lens 11 to compose the condenser lens 13, it is possible to implement an optical pickup and optical recording/reproducing apparatus of the near-field optical recording/reproducing system, in which the numerical aperture of condenser lens is 1 or more.

In addition, the area of a light spot condensed by the condenser lens can be reduced in inverse proportion to the square of a numerical aperture of the condenser lens.

Accordingly, if the wavelengths of light emitted from a light source in an optical recording/reproducing apparatus are set in the range of an oscillation wavelengths of, e.g. a double-wave laser of Nd:YAG laser (266 nm range), a diamond laser (240 nm range), or a double-wave laser of GaN laser (200 nm range), it is possible to realize an optical pickup device capable of recording on and reproducing from an optical recording medium higher in density.

The present invention is not limited to the above-described embodiments and various other modifications can be made without departing from the scope of the present invention.

According to the above-described invention, the numerical aperture of condenser lens can be increased and also a condenser lens which is small in size and light in weight can be obtained with ease.

Therefore, as compared with a case where the conventional condenser lens formed of glass material is employed, it is possible to greatly improve recording density and realize an optical pickup and optical recording/reproducing apparatus capable of recording on and reproducing from a recording medium higher in recording density and greater in capacity.

Moreover, when the condenser lens is composed of an optical lens made of strontium titanate or mainly made of strontium titanate and other optical lens (es), which are arranged successively from the objective side with their optical axes aligned, it is possible to reduce a diameter of luminous flux incident on the condenser lens.

Likewise, when the condenser lens is composed of an optical lens made of the above-described optical material or mainly made of the optical material and other optical lens(es), which are arranged successively from the objective side with their optical axes aligned, it is also possible to reduce a diameter of luminous flux incident on the condenser lens.

This makes it possible to reduce the size and weight of condenser lens which is controlled to be driven in a focusing direction and in a tracking direction, and also improve servo characteristics such as a focus servo, a tracking servo, a seek time or the like.

According to the above-described present invention, it is possible to increase the light transmissivity of optical lens in the ultraviolet-wavelength region.

Also, according to the present invention, it is possible to easily obtain a condenser lens which has a numerical aperture of 1 or more as well as an excellent light permeability and can be worked at low cost.

This enables an optical pickup and optical recording/reproducing apparatus to be realized, which are capable of recording on and reproducing from a recording medium that has a higher recording density and greater capacity than before.

Therefore, according to the present invention, it is possible to provide an optical pickup device and optical recording/reproducing apparatus capable of dealing with a light source having shorter wavelengths, which is anticipated with the optical recording medium becoming higher in density and greater in capacity in future.

The invention claimed is:

1. A condenser lens characterized by being composed of one or more optical lenses including an optical lens made of optical material selected among $HfO_2$—$Y_2O_3$, $HfO_2$—$TiO_2$, $HfO_2$—$Sc_2O_3$, $HfO_2$—$Nd_2O_3$, $HfO_2$-$Ln_2O_3$, $Sc_2O_3$, MgO, $Y_2O_3$, $WO_3$, $Gd_2O_3$, $Eu_2O_3$, $Dy_2O_3$ or mainly made of that optical material and wherein the condenser lens is composed of the optical lens made of said optical lens material and another optical lens and arranged with their optical axes aligned.

2. An optical pickup having at least a light source and a condenser lens that converges light emitted from the light source to form a light spot, characterized in that:
   said light source emits light of wavelengths in the range of 190–450nm, and
   said condenser lens is composed of one or more optical lenses including an optical lens made of optical material selected among $HfO2$—$Y_2O_3$, $HfO_2$—$TiO2$, $HfO_2$—$Sc_2O_3$, $HfO_2Nd_2O_3$, $HfO_2$-$Ln_2O_3$, $Sc_2O_3$, $Gd_2O3$, $Eu_2O_3$, $Dy_2O_3$ or mainly made of that optical material; and wherein two of said lenses are driven integrally or cooperatively as one body.

3. An optical recording/reproducing apparatus comprising an optical pickup having at least a light source and a condenser lens that converges light emitted from the light source to form a light spot for recording on and reproducing from a recording medium,
   the optical recording/reproducing apparatus characterized in that: said light source emits light of wavelengths in the range of 190–450nm, and
   said condenser lens is composed of one or more optical lenses including an optical lens made of optical material selected among $HfO_2$—$Y_2O_3$, $HfO_2$—$TiO_2$, $HfO_2$—$Sc_2O_3$, $HfO_2$—$Nd_2O_3$, $HfO_2$-$Ln_2O_3$, $Sc_2O_3$, $Gd_2O_3$, $Eu_2O_3$, $Dy_2O_3$ or mainly made of that optical material, and wherein the condenser lens is composed of the optical lens made of said optical material and another optical lens and arranged with their optical axes aligned.

* * * * *